(12) United States Patent
Dhingra et al.

(10) Patent No.: US 12,198,284 B2
(45) Date of Patent: Jan. 14, 2025

(54) APPLYING VECTOR-BASED DECALS ON THREE-DIMENSIONAL OBJECTS

(71) Applicant: Adobe Inc., San Jose, CA (US)

(72) Inventors: Sumit Dhingra, New Delhi (IN); Siddhartha Chaudhuri, Bangalore (IN); Vineet Batra, Pitam Pura (IN)

(73) Assignee: Adobe Inc., San Jose, CA (US)

( * ) Notice: Subject to any disclaimer, the term of this patent is extended or adjusted under 35 U.S.C. 154(b) by 17 days.

(21) Appl. No.: 18/054,248

(22) Filed: Nov. 10, 2022

(65) Prior Publication Data

US 2024/0161430 A1    May 16, 2024

(51) Int. Cl.
   *G06T 19/20*   (2011.01)
   *G06T 7/13*    (2017.01)

(52) U.S. Cl.
   CPC ............... *G06T 19/20* (2013.01); *G06T 7/13* (2017.01); *G06T 2200/24* (2013.01); *G06T 2207/20104* (2013.01); *G06T 2207/20164* (2013.01); *G06T 2219/2024* (2013.01)

(58) Field of Classification Search
   CPC ....... G06T 19/20; G06T 7/13; G06T 2200/24; G06T 2207/20104; G06T 2207/20164; G06T 2219/2024
   See application file for complete search history.

(56) References Cited

U.S. PATENT DOCUMENTS

2007/0052706 A1* 3/2007 Martin .................... G06T 17/20
                                                           345/423
2015/0325044 A1* 11/2015 Lebovitz ................. G06T 15/04
                                                           345/420
2019/0251745 A1*  8/2019 De Goes ................. G06T 19/20
2020/0026516 A1*  1/2020 Li ............................ B03C 1/01

OTHER PUBLICATIONS

Kasper Fischer, Piecewise Linear Approximation of Bezier Curves, Oct. 16, 2000 (https://hcklbrrfnn.files.wordpress.com/2012/08/bez.pdf).

Eivind Lyche Melvaer and Martin Reimers. Geodesic polar coordinates on polygonal meshes. Computer Graphics Forum, 31(8):2423-2435, Aug. 2012.

Ankit Phogat, Matthew Fisher, Danny M. Kaufman, and Vineet Batra. Skinning vector graphics with GANs. In ACM Siggraph 2019 Posters. ACM, Jul. 2019.

* cited by examiner

*Primary Examiner* — Michelle Chin
(74) *Attorney, Agent, or Firm* — Keller Preece PLLC

(57) ABSTRACT

This disclosure describes one or more implementations of systems, non-transitory computer-readable media, and methods that apply a resolution independent, vector-based decal on a 3D object. In one or more implementations, the disclosed systems apply piecewise non-linear transformation on an input decal vector geometry to align the decal with a surface of an underlying 3D object. To apply a vector-based decal on a 3D object, in certain embodiments, the disclosed systems parameterize a 3D mesh of the 3D object to create a mesh map. Moreover, in some instances, the disclosed systems determine intersections between edges of a decal geometry and edges of the mesh map to add vertices to the decal geometry at the intersections. Additionally, in some implementations, the disclosed systems lift and project vertices of the decal geometry into three dimensions to align the vertices with faces of the 3D mesh of the 3D object.

20 Claims, 30 Drawing Sheets

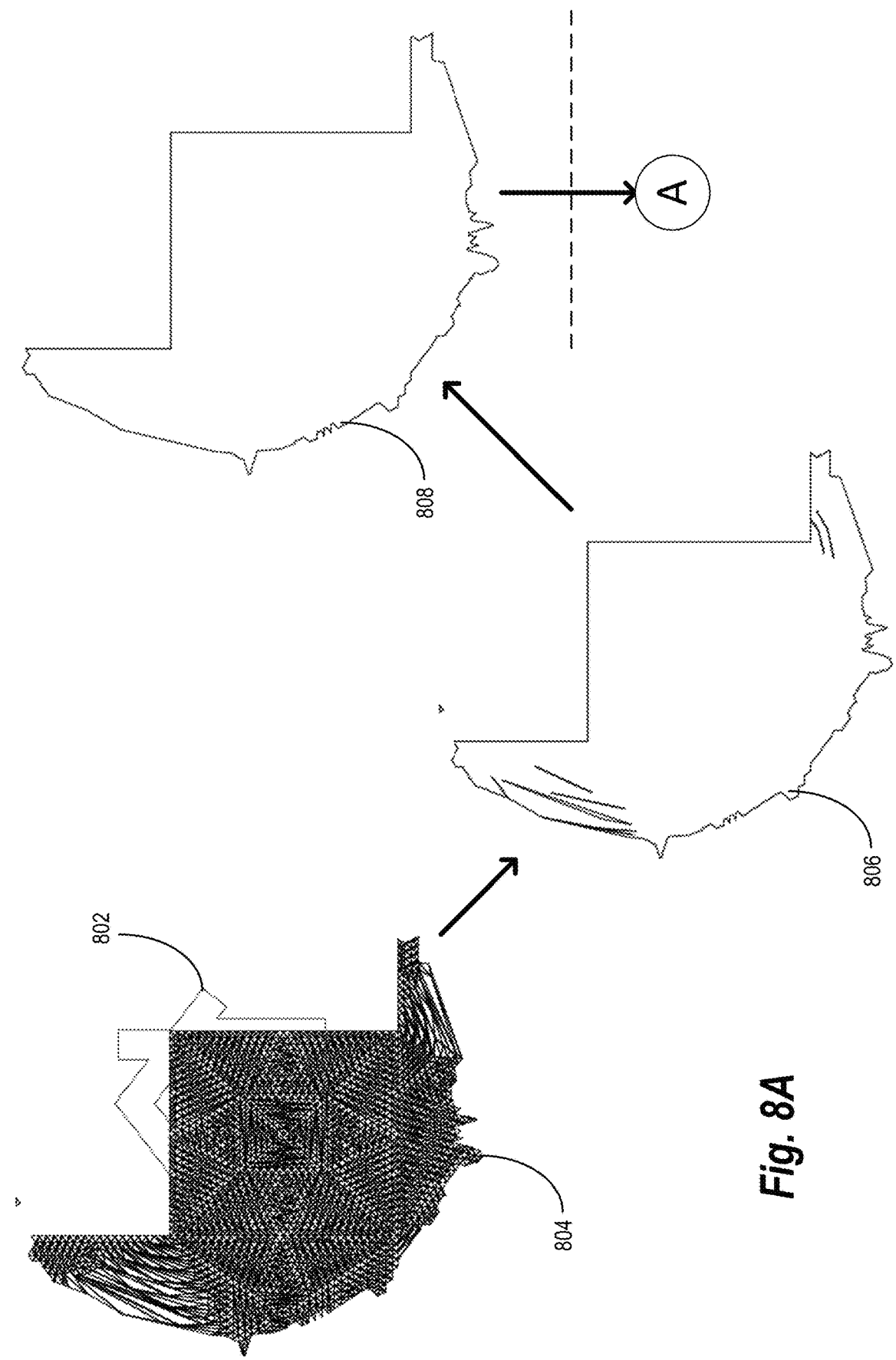

APPLYING VECTOR-BASED DECALS ON THREE-DIMENSIONAL OBJECTS

BACKGROUND

Recent years have seen an increase in the creation and modification of three-dimensional (3D) computer graphics content. For example, individuals and businesses increasingly utilize computing devices to create, upload, modify, and view three-dimensional computer graphics content. In many cases, graphics designers often utilize graphics modification programs to visualize decals on 3D objects by placing two-dimensional (2D) images on a surface of a 3D object. To apply decals on 3D objects, many conventional systems apply decals as flat 2D textures (e.g., raster images) to 3D objects in which the text and other content of the decals are rasterized to the 2D texture and, as a result, suffer from a loss in resolution. Indeed, although many conventional systems apply decals to 3D objects via rasterization, many of these conventional systems have a number of shortcomings, particularly with regards to flexibly and accurately applying decals to 3D objects such that the decals remain resolution independent when applied to 3D objects.

SUMMARY

This disclosure describes one or more implementations of systems, non-transitory computer readable media, and methods that solve one or more of the foregoing problems by applying a resolution independent, vector-based decal on a 3D object. In particular, in one or more implementations, the disclosed systems apply piecewise non-linear transformation on an input vector geometry (of a decal) to align the decal with a surface of an underlying 3D object. To apply a vector-based decal on a 3D object, in one or more embodiments, the disclosed systems parameterize a 3D mesh of the 3D object to create a mesh map (e.g., a UV map). Moreover, in one or more instances, the disclosed systems determine intersections between edges of a decal geometry (e.g., a polyline geometry of the decal) and edges of the mesh map to add vertices to the decal geometry at the intersections. Additionally, in one or more implementations, the disclosed systems lift and project vertices of the decal geometry into three dimensions to align the vertices with faces of the 3D mesh of the 3D object. In some implementations, the disclosed systems also further refine the application of the vector-based decal onto the 3D object by subdividing faces of the 3D mesh, removing occluded regions of the mesh map, clipping the decal geometry at boundaries of the mesh map, and reconstructing curve segments of the projected decal geometry.

In this manner, the disclosed systems, in one or more embodiments, apply decals to 3D objects as a vector that is resolution independent (to preserve detail), supports vector compositing operations, and applies to multiple surfaces of 3D objects.

BRIEF DESCRIPTION OF THE DRAWINGS

The detailed description is described with reference to the accompanying drawings in which:

FIGS. 8A-8D illustrate a vector decal application system clipping a decal geometry of a vector-based decal in accordance with one or more implementations.

DETAILED DESCRIPTION

Figure 1:
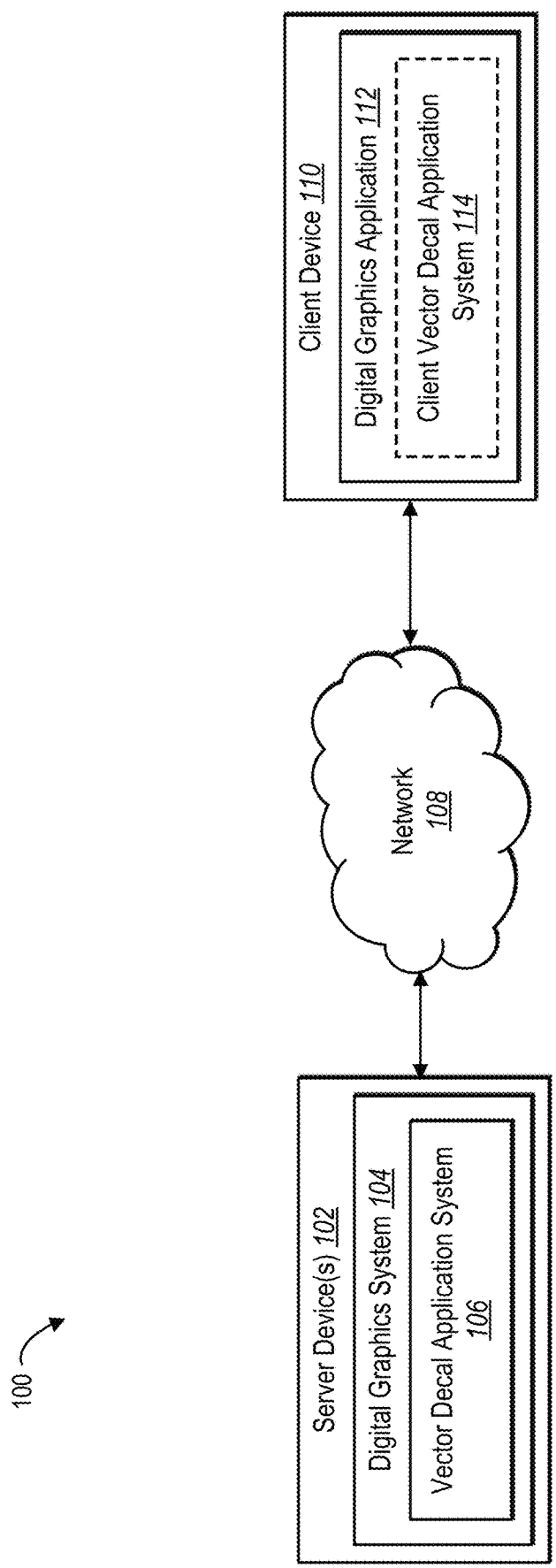
FIG. 1 illustrates a schematic diagram of an example environment in which a vector decal application system operates in accordance with one or more implementations.

This disclosure describes one or more implementations of a vector decal application system that applies resolution independent, vector-based decals (with arbitrary path geometry) on a 3D object without rasterizing to a texture. In particular, in one or more implementations, the vector decal application system parameterizes a 3D mesh of a 3D object to generate a mesh map (e.g., a UV map) for a user selected region on the 3D object at which to apply a vector-based decal. Moreover, in one or more embodiments, the vector decal application system converts the vector-based decal to a decal geometry (e.g., a polyline geometry of the vector-based decal). Furthermore, in one or more implementations, the vector decal application system introduces vertices to the decal geometry at identified intersections between line segments of the decal geometry and edges of the mesh map. Subsequently, in some embodiments, the vector decal application system applies the vector-based decal to the 3D object (at the user selected region) by lifting and projecting coordinates of the vertices of the decal geometry into three-dimensions by reverse mapping the coordinates to points in the 3D mesh.

To illustrate, in one or more embodiments, the vector decal application system receives a user selection of a region on a 3D object with a request to apply a vector-based decal on the 3D object at the selected region. Upon receiving the selected region, in one or more implementations, the vector decal application system parameterizes faces of a 3D mesh of the 3D object to generate a mesh map (e.g., a UV mesh map in a UV space) for the selected region. In some cases, the vector decal application system subdivides faces of the 3D mesh to improve density of the 3D mesh. Additionally, in one or more embodiments, the vector decal application system also identifies occluded faces of the 3D mesh (e.g., using ray tracing) and removes the occluded faces from the parameterized mesh map.

Furthermore, in one or more embodiments, the vector decal application system positions the vector-based decal on the mesh map centered at the user selected region (or position). In one or more instances, the vector decal application system also converts the vector-based decal into a decal geometry. In particular, in one or more embodiments, the vector decal application system subdivides one or more curved paths in the vector-based decal to piece-wise linear form (e.g., a polyline geometry). Moreover, in certain instances, the vector decal application system also identifies boundaries from the mesh map and clips the decal geometry of the vector-based decal to ensure that the decal geometry remains within the parameterized mesh map.

In addition, in one or more embodiments, the vector decal application system maps vertices of the decal geometry of the vector-based decal to the mesh map. In particular, in one or more implementations, the vector decal application system identifies intersections between line segments of the decal geometry (e.g., a polyline geometry) and line segments (or edges) of the mesh map. Moreover, in one or more embodiments, the vector decal application system introduces (or adds) vertices to the decal geometry at the identified intersection points.

Moreover, in one or more implementations, the vector decal application system applies the decal to the 3D object by projecting the mapped decal geometry into three dimensions. In particular, the vector decal application system utilizes the mapped decal geometry and the parameterized mesh map to lift and project the mapped decal geometry into three dimensions to apply the vector-based decal onto a surface of the 3D object. To illustrate, in one or more embodiments, the vector decal application system determines barycentric coordinates of vertices of the decal geometry in faces (e.g., triangular faces) of the mesh map. Subsequently, in one or more implementations, the vector decal application system lifts the decal geometry into three-dimensions by utilizing the barycentric coordinates of the vertices to reverse map the barycentric coordinates to corresponding points in the 3D mesh of the 3D object. Moreover, in one or more embodiments, the vector decal application system utilizes camera projection to project the three-dimensional vertices of the lifted decal geometry onto planes of the 3D object (e.g., surface planes of the 3D object) to apply the vector-based decal on the 3D object. In some instances, the vector decal application system also reconstructs curve segments on the decal geometry utilizing curve fitting.

Additionally, in one or more embodiments, the vector decal application system applies the vector-based decal onto a 3D object as a separate layer that is resolution independent (to preserve detail) and supports vector compositing operations. In particular, in one or more embodiments, the vector decal application system applies the vector-based decal to the 3D object such that the vector-based decal remains resolution independent and without loss of detail. Accordingly, the vector decal application system enables movement of the vector-based decal to other regions of the 3D object and/or resizing of the vector-based decal on the 3D object. Moreover, due to the vector-based decal being a separate layer from the 3D object, the vector decal application system also facilitates the various vector compositing operations (or modifications), such as, but not limited to, blend operations (e.g., transparency) and/or visual characteristic changes. Furthermore, in one or more embodiments, the vector decal application system applies the vector-based decal such that the decal is decoupled from a rendering pipeline which enables the vector-based decal to wrap along 3D objects, including imaginary 3D objects (e.g., 3D objects that represent shapes of 3D models). Moreover, in some instances, the vector decal application system, enables the application of multiple vector-based decals on a 3D object and the application of a vector-based decal(s) across multiple surfaces in the 3D object.

As mentioned above, conventional systems suffer from a number of technical deficiencies. For instance, during the application of a decal on a 3D object, conventional systems are often prone to a loss of detail in the applied decals, prone to undesirable distortion in the applied decals, and result in rigid applications. For example, many conventional systems apply decals to 3D objects by compositing decals on 3D surfaces after converting to raster (e.g., rasterizing decals to flat 2D textures). However, conventional systems that rasterize to a texture and apply the rasterized texture as a decal often result in decals that are not resolution independent and also difficult to comprehend (e.g., blurry, pixelated). In addition, utilizing rasterized, flat 2D textures as decals often leads inflexible conventional systems that create decals that are not robust by being incapable of modification and/or incapable of application in more than one surface of a 3D object. In some conventional systems, decals are mapped onto 3D surfaces in a vector domain; However, such conventional systems cause distortion in the applied decals and are limited to applying decals only to a single surface of a 3D object.

The vector decal application system provides a number of advantages relative to these conventional systems. For example, unlike conventional systems that apply rasterized, flat 2D textures as decals, the vector decal application system applies arbitrary path geometries as decals on 3D objects without rasterizing to a texture such that the resulting decal is a vector and is resolution independent (by applying non-linear transformation on an input vector geometry of the decal to align the vector geometry with a surface of the underlying 3D object). Indeed, the vector decal application system applies vector-based decals to 3D objects that are resolution independent and, thus, the resulting decal does not experience a loss in detail (e.g., no pixelation irrespective of scale or zoom applied).

Additionally, in contrast to many conventional systems that result in rigid decals, the vector decal application system applies robust decals that are capable of modification and capable of application on multiple surfaces of a 3D object (without distortion or undesirable clipping). In particular, in many instances, the vector decal application system applies vector-based decals as separate layers from 3D objects that support various vector compositing operations, such as, but not limited to, effect modes (e.g., transparency, hue) and/or blend modes. In addition, in one or more implementations, the vector decal application system also enables various modifications to the vector-based decals on 3D objects, such as, but not limited to, scaling and movement. In addition, in one or more embodiments, the vector decal application system also applies vector-based decals that apply across multiple surfaces (e.g., with different offsets) in a 3D object without distortion or omitting the display of the decal on the additional surfaces. Additionally, in certain implementations, the vector decal application system also enables the application of multiple decals on a 3D object simultaneously.

Turning now to the figures, FIG. 1 illustrates a schematic diagram of one or more implementations of a system 100 (or environment) in which a vector decal application system operates in accordance with one or more implementations. As illustrated in FIG. 1, the system 100 includes a server device(s) 102, a network 108, and a client device 110. As further illustrated in FIG. 1, the server device(s) 102 and the client device 110 communicate via the network 108.

In one or more implementations, the server device(s) 102 includes, but is not limited to, a computing (or computer) device (as explained below with reference to FIG. 15). As shown in FIG. 1, the server device(s) 102 include a digital graphics system 104 which further includes the vector decal application system 106. The digital graphics system 104 is able to create, display, and/or modify various two-dimensional and three-dimensional objects with elements, such as, but not limited to, decals, textures, offsets, materials, and/or visual settings (e.g., lighting, transparency, color).

Moreover, as explained below, the vector decal application system 106, in one or more embodiments, applies a resolution independent, vector-based decal on a 3D object. In some implementations, the vector decal application system 106 parameterizes a 3D mesh of a 3D object to generate a mesh map (e.g., a UV map) for a region on a 3D object at which to apply a vector-based decal. Then, the vector decal application system 106 introduces vertices to a decal geometry of the vector-based decal at identified intersections between line segments of the decal geometry and edges of the mesh map. Furthermore, in one or more embodiments, the vector decal application system 106 applies the vector-based decal to the 3D object (at the region) by lifting and projecting coordinates of the vertices of the decal geometry into three-dimensions.

Furthermore, as shown in FIG. 1, the system 100 includes the client device 110. In one or more implementations, the client device 110 includes, but is not limited to, a mobile device (e.g., smartphone, tablet), a laptop, a desktop, or any other type of computing device, including those explained below with reference to FIG. 15. In certain implementations, although not shown in FIG. 1, the client device 110 is operated by a user to perform a variety of functions (e.g., via the digital graphics application 112). For example, the client device 110 performs functions such as, but not limited to, receiving and/or creating a decal(s), receiving and/or creating a 3D object(s), receiving a user selection(s) of a region(s) within the 3D object(s), receiving a request(s) to apply the decal(s) on the 3D object(s), and/or modifying the decal(s) on the 3D object(s).

To access the functionalities of the vector decal application system 106 (as described above), in one or more implementations, a user interacts with the digital graphics application 112 on the client device 110. For example, the digital graphics application 112 includes one or more software applications installed on the client device 110 (e.g., apply vector-based decals on 3D objects in accordance with one or more implementations herein). In some cases, the digital graphics application 112 is hosted on the server device(s) 102. In addition, when hosted on the server device(s) 102, the digital graphics application 112 is accessed by the client device 110 through a web browser and/or another online interfacing platform and/or tool.

Although FIG. 1 illustrates the vector decal application system 106 being implemented by a particular component and/or device within the system 100 (e.g., the server device(s) 102), in some implementations, the vector decal application system 106 is implemented, in whole or in part, by other computing devices and/or components in the system 100. For example, in some implementations, the vector decal application system 106 is implemented on the client device 110 within the digital graphics application 112 (e.g., via a client vector decal application 114). Indeed, in one or more implementations, the description of (and acts performed by) the vector decal application system 106 are implemented (or performed by) the client vector decal application 114 when the client device 110 implements the vector decal application system 106. More specifically, in some instances, the client device 110 (via an implementation of the vector decal application system 106 on the client vector decal application 114) applies a resolution independent, vector-based decal on a 3D object.

Additionally, as shown in FIG. 1, the system 100 includes the network 108. As mentioned above, in some instances, the network 108 enables communication between components of the system 100. In certain implementations, the network 108 includes a suitable network and may communicate using any communication platforms and technologies suitable for transporting data and/or communication signals, examples of which are described with reference to FIG. 15. Furthermore, although FIG. 1 illustrates the server device(s) 102 and the client device 110 communicating via the network 108, in certain implementations, the various components of the system 100 communicate and/or interact via other methods (e.g., the server device(s) 102 and the client device 110 communicating directly).

Figure 2A:
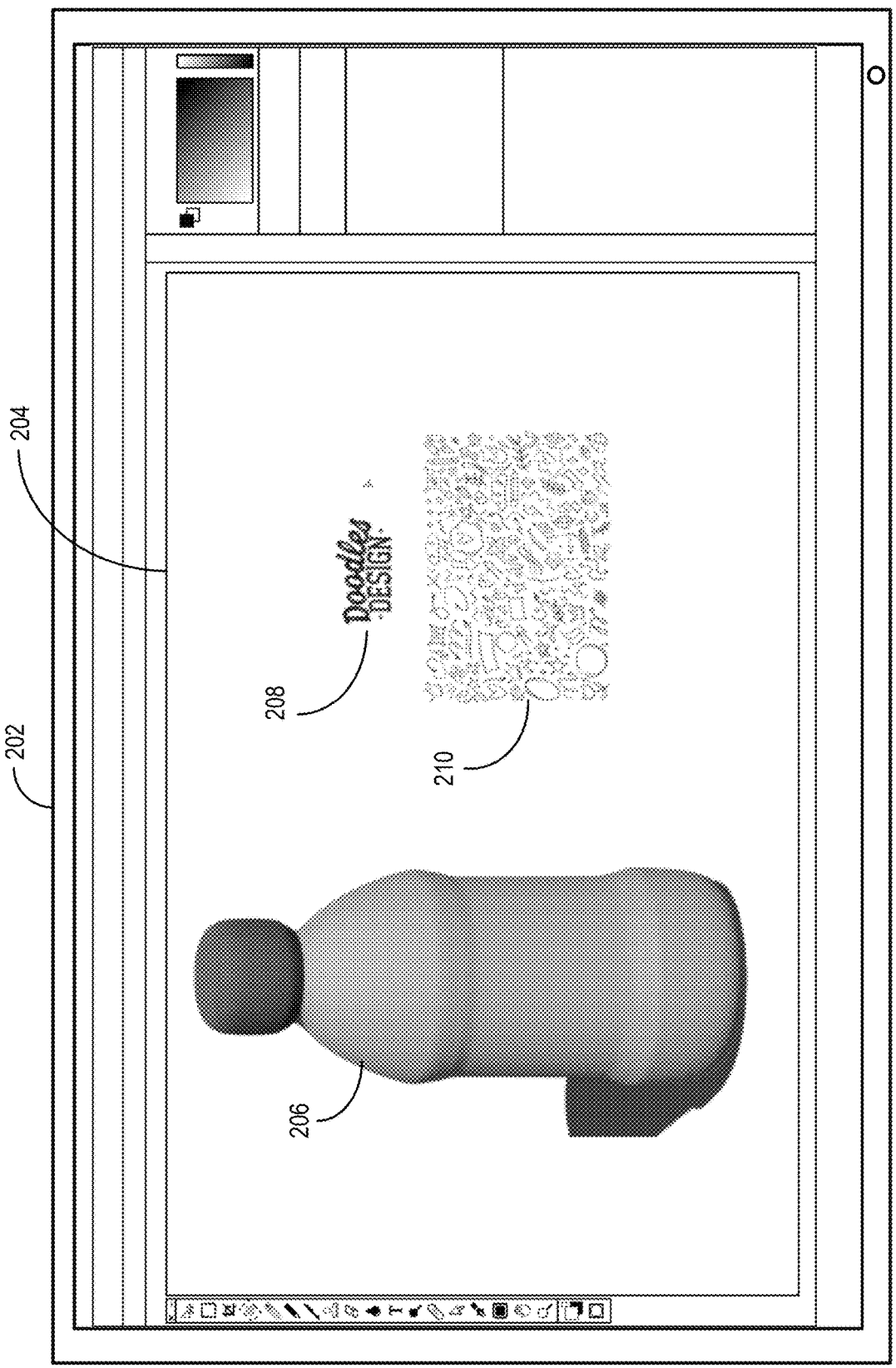
FIGS. 2A-2C illustrate a vector decal application system displaying an application of a vector-based decal on a 3D object in accordance with one or more implementations.
Figure 2B:
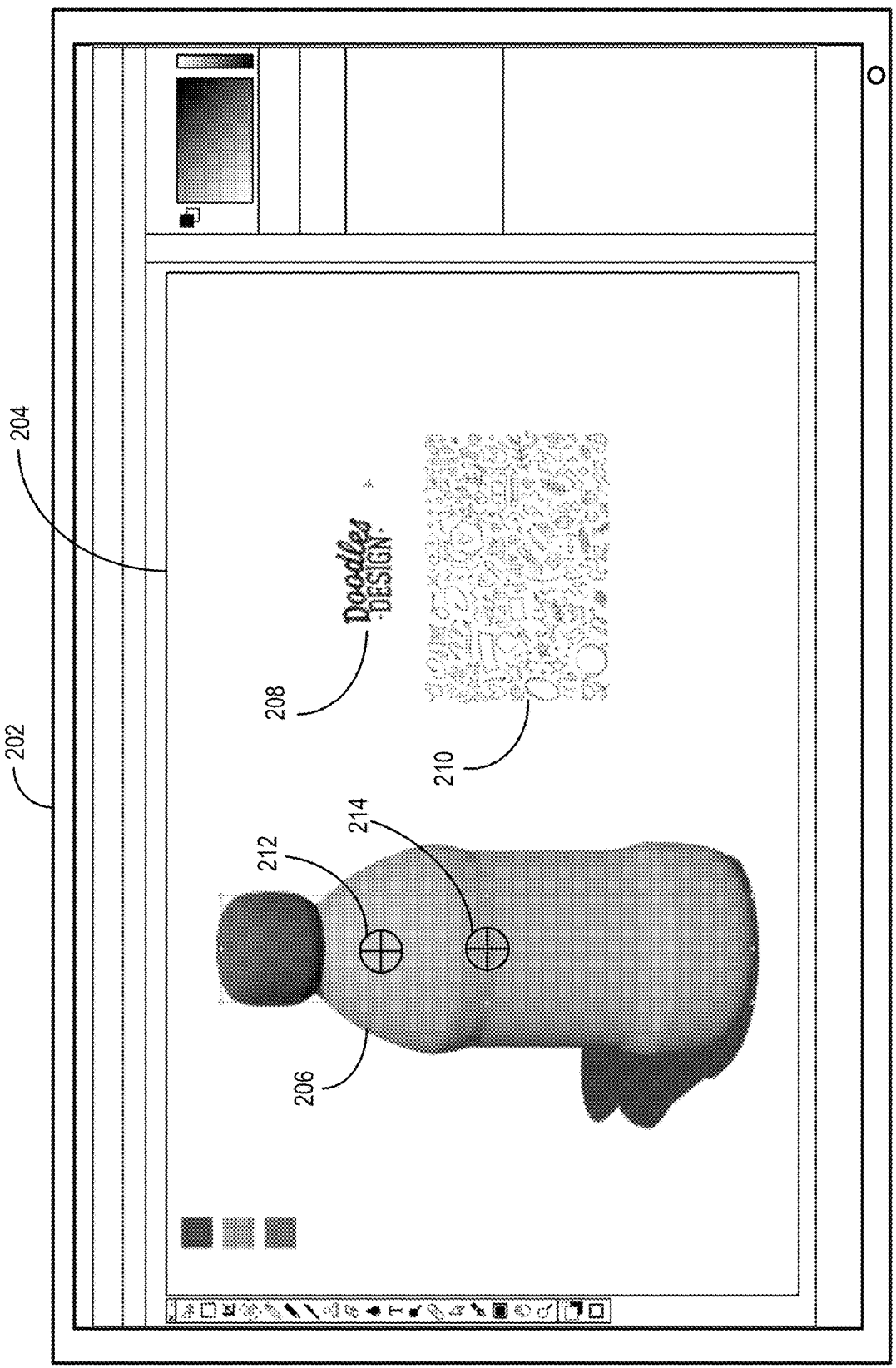
Figure 2C:
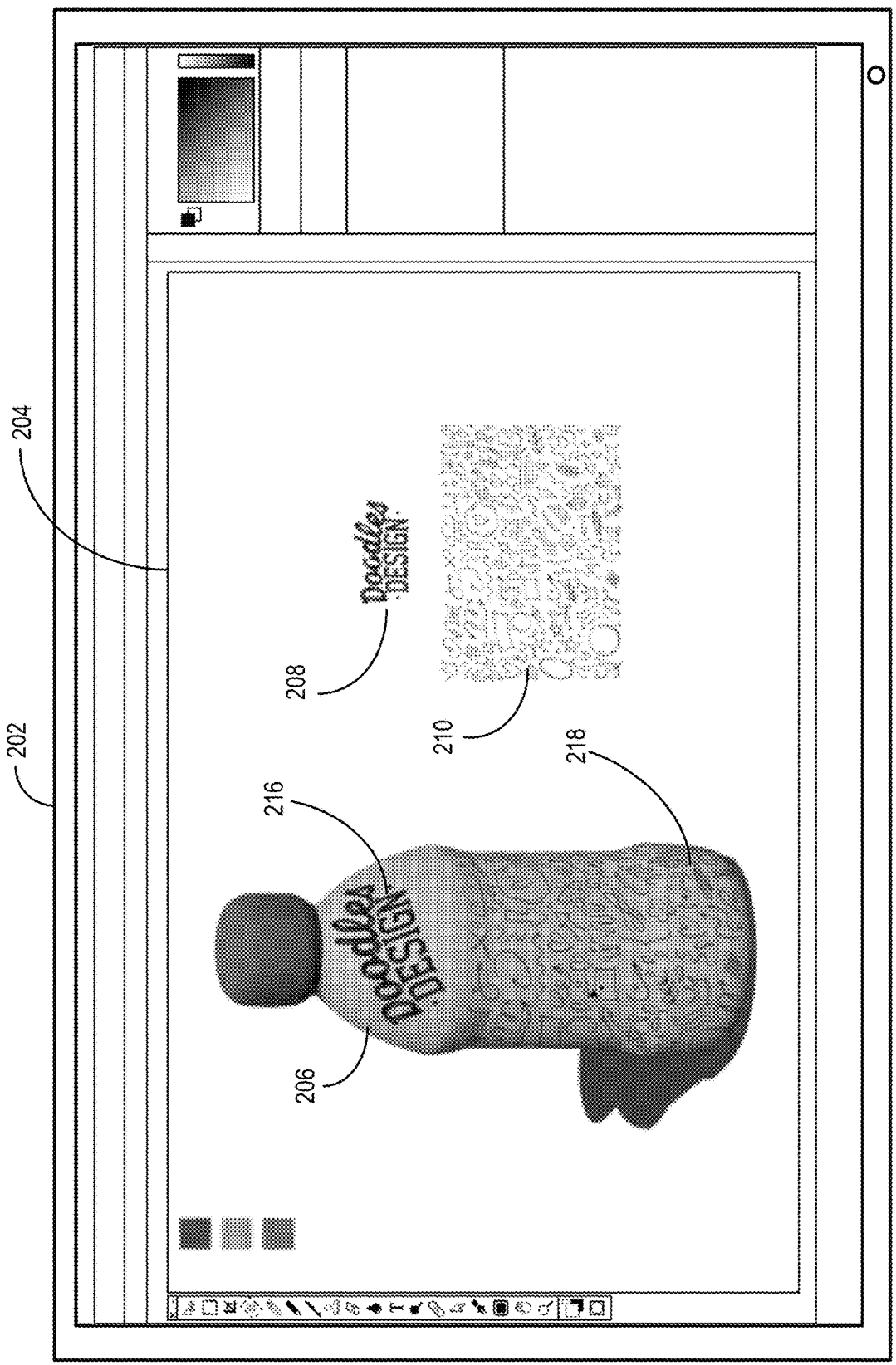

In one or more implementations, the vector decal application system 106 applies a vector-based decal on a user selected region of a 3D object. As an example, FIGS. 2A-2C illustrate the vector decal application system 106 displaying, within a graphical user interface of a client device, a 3D object and the application of a vector-based decal on the 3D object. In particular, FIGS. 2A-2C illustrate an example of receiving a user selection of a region in relation to a displayed 3D object and applying the vector-based decal to the 3D object.

For instance, as shown in FIG. 2A, the vector decal application system 106 provides, for display within a graphical user interface 204 of a client device 202, a 3D object 206 (e.g., a 3D bottle), a first decal 208 and a second decal 210. In one or more embodiments, the vector decal application system 106 receives a user selection and/or request to display the 3D object 206, the first decal 208, and the second decal 210 within the graphical user interface 204 (e.g., via a selection from a content list, via upload of a file, via a file selection on the client device and/or a cloud service).

Subsequently, as shown in the transition from FIG. 2A to FIG. 2B, the vector decal application system 106 receives, from the client device 202, a user selection of a region on the 3D object 206 on which to apply a decal. For instance, as shown in the graphical user interface 204 of FIG. 2B, the vector decal application system 106 receives a first user selected region 212 on which to apply the first decal 208 and a second user selected region 214 on which to apply the second decal 210. Then, as shown in the transition from FIG. 2B to FIG. 2C, the vector decal application system 106 applies the first decal 208 and the second decal 210 on the 3D object 206. For instance, as shown in FIG. 2C, the vector decal application system 106 applies the first decal 208 at the first user selected region 212 as applied first decal 216 and applies the second decal 210 at the second user selected region 214 as applied second decal 218 (in accordance with one or more implementations herein). Although FIGS. 2A-2C illustrate the vector decal application system 106 applying two decals to a 3D object, in one or more implementations, the vector decal application system 106 applies various numbers of decals (e.g., one, four, ten) to a 3D object in accordance with one or more implementations herein.

Figure 3:
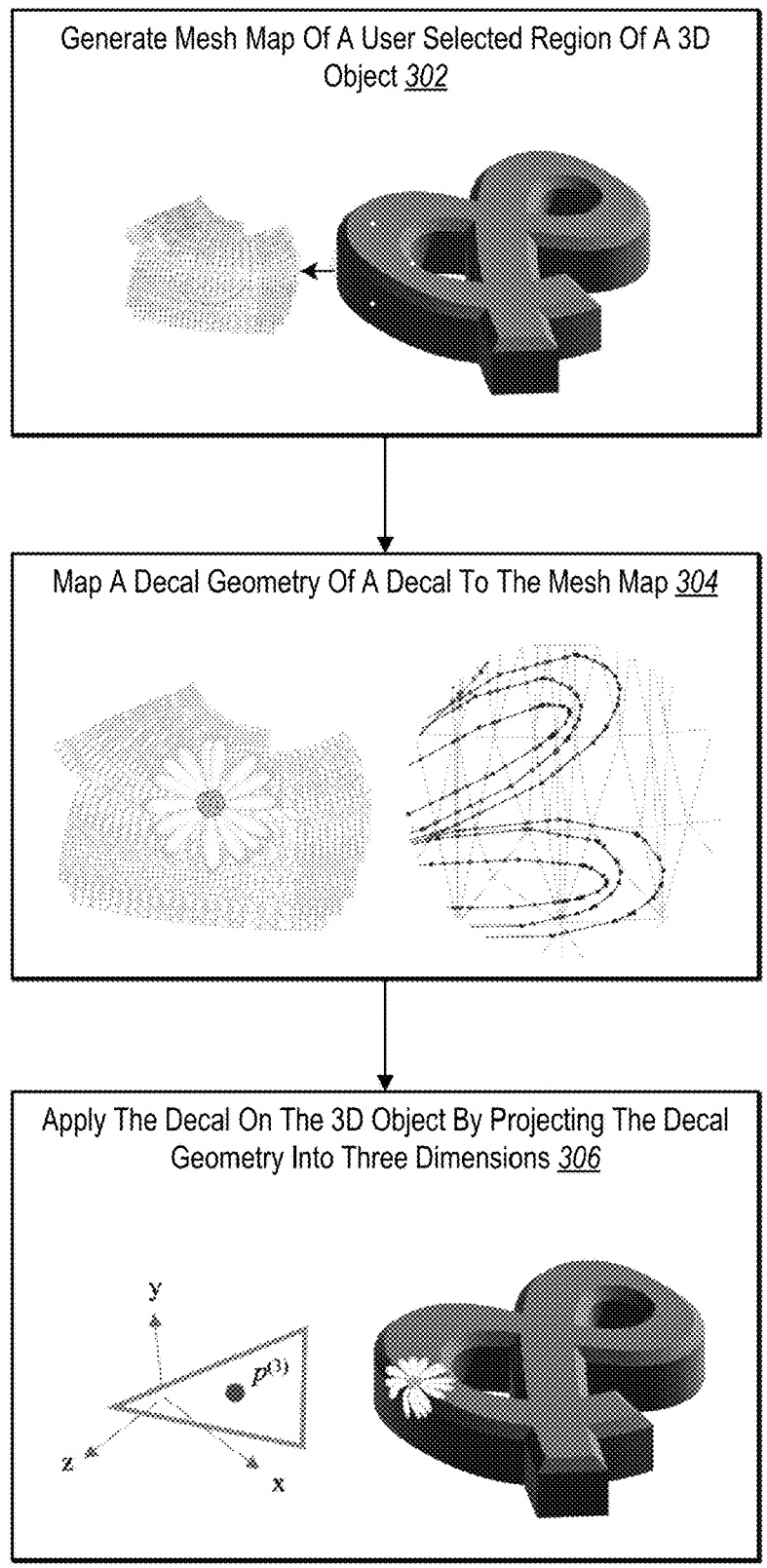
FIG. 3 illustrates an overview of a vector decal application system applying a vector-based decal on a 3D object through piecewise non-linear transformation on an input decal vector geometry in accordance with one or more implementations.

Furthermore, FIG. 3 illustrates an overview of the vector decal application system 106 applying a vector-based decal on a 3D object through piecewise non-linear transformation on an input vector geometry (of a decal) to align the vector-based decal with a surface of the underlying 3D object. Indeed, FIG. 3 illustrates the vector decal application system 106 generating a mesh map for a 3D object, mapping a decal geometry to the mesh map, and applying the mapped decal on the 3D object through projection of the decal geometry into three-dimensions.

As shown in act 302 of FIG. 3, the vector decal application system 106 generates a mesh map of a user selected region of a 3D object. In some instances, the vector decal application system 106 receives a user selection of a region in relation to a 3D object with a request to apply a particular decal at the selected region. Subsequently, in one or more embodiments, the vector decal application system 106 parameterizes a 3D mesh of the 3D object at the selected region to generate a mesh map. In some cases, the vector decal application system 106 also subdivides faces of the 3D mesh prior to parameterizing the 3D mesh and/or removes occluded faces from the mesh map. Indeed, in one or more implementations, the vector decal application system 106 generates a mesh map as described below (e.g., as described in relation to FIGS. 4 and 5).

In one or more embodiments, a three-dimensional (3D) object includes digital content having one or more shapes in three dimensions (e.g., having a length, width, and height). In particular, in one or more embodiments, a 3D object includes a digital content item (e.g., a graphics rendering, computer model, digital image, digital video) that depicts (or portrays) one or more shapes in three-dimensions to portray a solid figure (or object) that is viewable from multiple angles (e.g., a 360-degree view). For example, a 3D object includes vertices and edges that form faces of a surface of the 3D object. In some cases, the vector decal application system 106 utilizes textures, materials, shaders, and meshes to represent (or render) 3D objects.

Additionally, in one or more implementations, a three-dimensional (3D) mesh (sometimes referred to as a "mesh") refers to a polygonal structure that models the shape (and/or surface) of a 3D object. In particular, in one or more embodiments, a 3D mesh includes a collection of vertices and edges that create faces that represent a 3D object (or 3D model). In one or more embodiments, the faces of a 3D mesh include triangular shapes that define the shape (and/or surface) of a 3D object (e.g., by creating a three-dimensional structure). Although one or more embodiments herein illustrate a 3D mesh with triangular faces, the vector decal application system 106, in some cases, utilizes 3D meshes with a variety of polygonal faces (e.g., squares, rectangles, pentagons).

Furthermore, in one or more instances, a mesh map refers to a two-dimensional (2D) set of faces (of the 3D mesh) that represents the surface of a 3D mesh in 2D (e.g., as a flattened map). In some cases, the mesh map is a flattened representation of the surface of the 3D mesh (or 3D model) based on vertices, edges, faces, and/or seams of the 3D mesh. In certain instances, the mesh map includes a UV map having horizontal coordinates (U) and vertical coordinates (V) to represent the surface of the 3D mesh in two dimensions (e.g., by unwrapping a 3D mesh surface into two dimensions).

As further shown in act 304 of FIG. 3, the vector decal application system 106 maps a decal geometry of a decal to the mesh map. In particular, as shown in the act 304 of FIG. 3, the vector decal application system 106 positions the decal on the mesh map. In addition, in some cases, the vector decal application system 106 converts the decal to a decal geometry (e.g., a polyline geometry). Then, as shown in the act 304 of FIG. 3, the vector decal application system 106 introduces vertices to the decal geometry based on intersections between edges of the decal geometry and edges of the mesh map. Indeed, in one or more embodiments, the vector decal application system 106 maps a decal geometry to a mesh map of a 3D object as described below (e.g., as described in relation to FIGS. 6-9).

In one or more embodiments, a decal includes an image that represents (or depiction) of a symbol, design, picture, label, logo, and/or text. In particular, in some instances, a decal includes an image that is applied (or transferred) to a surface of a graphical object (e.g., a 3D object or a 2D object). Furthermore, in one or more embodiments, a vector-based decal includes a decal that is represented using vector imaging. For example, a vector-based decal includes an image having points (or vertices), lines (or edges), and curves based on mathematical formulas to represent (or depict) shapes, symbols, designs, pictures, icons, logos, labels, fonts, maps, and/or text.

Additionally, in one or more embodiments, a decal geometry includes a shape represented by one or more curves (or paths) utilizing line segments. In one or more embodiments, the vector decal application system 106 generates a decal geometry from a vector-based decal by determining (or identifying) Bezier curves from points, lines, and curves of a vector-based decal and converting the Bezier curves to a polyline geometry. In some cases, the decal geometry is a polyline geometry which represents a collection of paths belonging to line segments and vertices of a vector-based decal.

Moreover, as shown in act 306 of FIG. 3, the vector decal application system 106 applies the decal on the 3D object by projecting the decal geometry into three dimensions. Indeed, as shown in act 306 of FIG. 3, the vector decal application system 106 determines barycentric coordinates of vertices of the decal geometry in faces (e.g., triangular faces) of the mesh map. Moreover, in one or more implementations, the vector decal application system lifts the decal geometry into three-dimensions by utilizing the barycentric coordinates of the vertices to reverse map the barycentric coordinates to corresponding points in the 3D mesh of the 3D object (to apply the vector-based decal on top of the surface of the 3D object). In one or more embodiments, the vector decal application system 106 applies the decal on the 3D object via projection into three dimensions as described below (e.g., as described in relation to FIG. 10).

In one or more embodiments, the vector decal application system 106 utilizes barycentric coordinates of the vertices of the decal geometry. In some cases, barycentric coordinates include coordinates that are uniquely defined for a vertex within a face of a mesh or mesh map (e.g., a triangular face). In some embodiments, a barycentric coordinate includes three mass values that indicate a center of gravity (barycenter) that coincides with a position of a vertex (or point) within a face of a mesh or mesh map (e.g., a triangular face).

Figure 4:
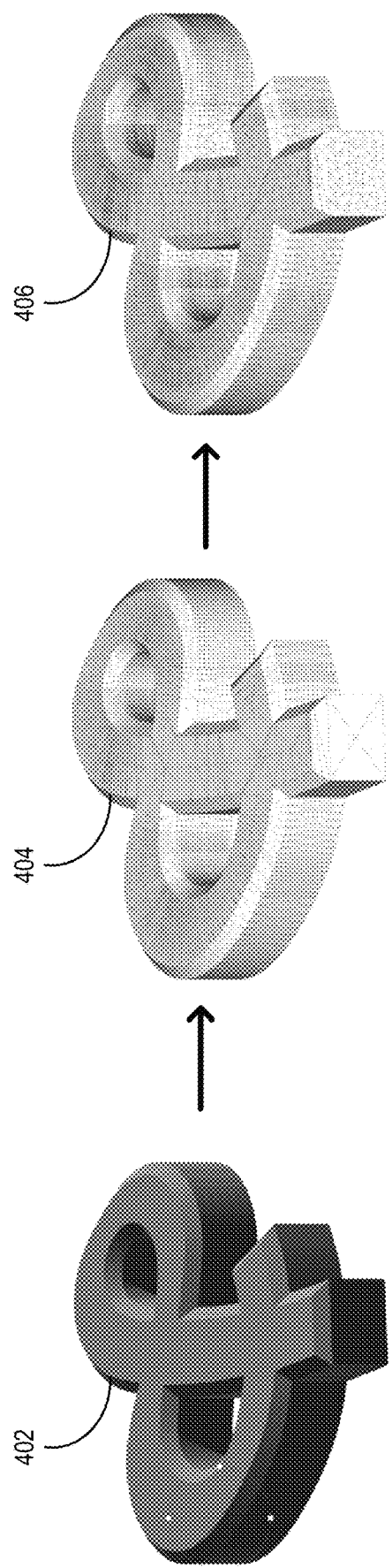
FIG. 4 illustrates a vector decal application system generating a 3D mesh for a 3D object in accordance with one or more implementations.

As mentioned above, in some embodiments, the vector decal application system 106 generates (or identifies) a 3D mesh for a 3D object. For example, FIG. 4 illustrates the vector decal application system 106 generating a 3D mesh for a 3D object. In addition, FIG. 4 also illustrates the vector decal application system 106 subdividing faces of a 3D mesh.

For instance, as shown in FIG. 4, the vector decal application system 106 identifies (or generates) a 3D mesh 404 for the 3D object 402. As illustrated in FIG. 4, the 3D mesh 404 includes faces (via edges and vertices) that models the shape of the 3D object 402 through a polygonal structure. Indeed, as shown in FIG. 4, the 3D mesh 404 includes various triangular faces to represent surfaces of the 3D object 402.

Furthermore, as shown in FIG. 4, the vector decal application system 106 subdivides faces of the 3D mesh 404 to generate a dense 3D mesh 406. As shown in FIG. 4, the vector decal application system 106 subdivides various faces of the 3D mesh 404 to generate additional faces in the dense 3D mesh 406. As illustrated in FIG. 4, by subdividing faces of the 3D mesh 404, the vector decal application system 106 enables the dense 3D mesh 406 (via the addition of a larger number of smaller triangular faces) to capture an increased amount and granularity of detail for surfaces of the 3D object in each of the triangular faces on the dense 3D mesh 406 (e.g., to reduce overlapping and/or intersecting faces in a mesh map).

In some cases, the vector decal application system 106 utilizes edge-length based subdivision with one or more of the faces of the 3D mesh to subdivide the faces of the 3D mesh. For example, the vector decal application system 106 subdivides a face of the 3D mesh on each edge of the face proportionally to the length of the edge. In one or more embodiments, the vector decal application system 106 utilizes various approaches to subdivide faces of a 3D mesh, such as, but not limited to, Catmull-Clark subdivision, Loop subdivision, Doo-Sabin subdivision, mid-edge subdivision, and/or cube root subdivision.

Figure 5:
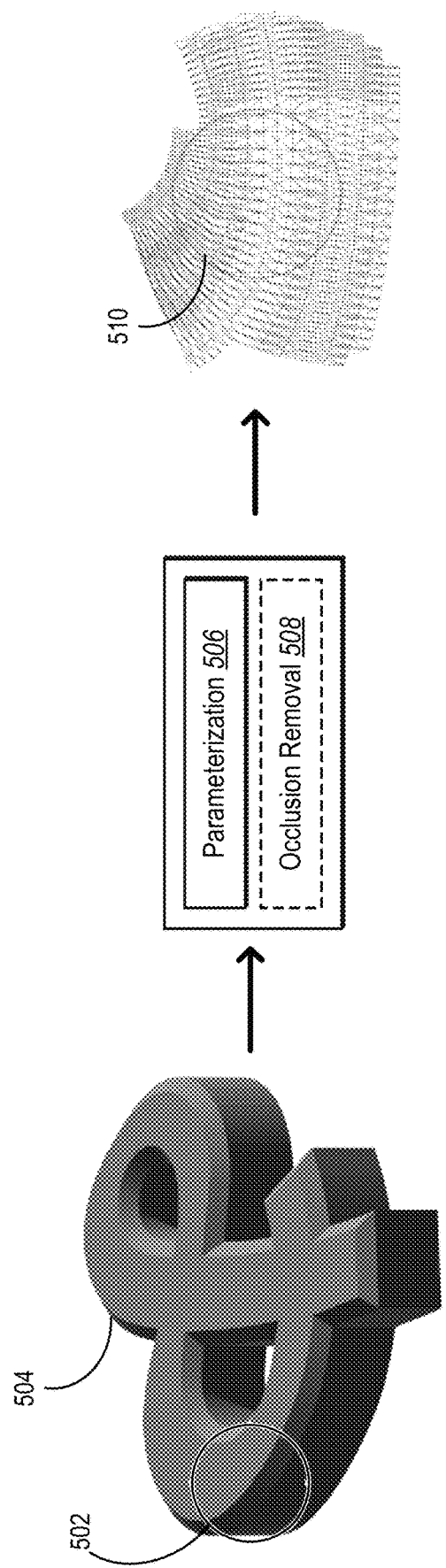
FIG. 5 illustrates a vector decal application system generating a mesh map via for a user selected region of a 3D object in accordance with one or more implementations.

As mentioned above, in one or more implementations, the vector decal application system 106 generates a mesh map for a user selected region of a 3D object. For instance, FIG. 5 illustrates the vector decal application system 106 generating a mesh map for a 3D object. In particular, FIG. 5 illustrates the vector decal application system 106 generating a mesh map via parameterization for a user selected region of a 3D object.

For instance, as shown in FIG. 5, the vector decal application system 106 receives a user selection of a region 502 on the 3D object 504 (to indicate a position for the application of a decal). As further shown in FIG. 5, the vector decal application system 106 (in an act 506) parameterizes a 3D mesh (e.g., a 3D mesh as illustrated in FIG. 4) at the region 502 for the 3D object 504 to generate a mesh map 510. As shown in FIG. 5, the vector decal application system 106 generates the mesh map 510 as a flattened representation of the surface of a 3D mesh for the 3D object 504 at the user selected region 502.

In certain implementations, the vector decal application system 106 receives a user selection of a region within the 3D object for placement of the decal. In some embodiments, the vector decal application system 106 receives a user interaction (e.g., a user click, a user touch screen interaction) on a point on a 3D mesh of a 3D object. Then, in one or more implementations, the vector decal application system 106 computes a circular region in the 3D mesh at the selected point. Moreover, in one or more embodiments, the vector decal application system 106 converts the (x, y) coordinates of the user selected location (screen coordinates) into (x, y, z) coordinates in a camera coordinate system. Additionally, in certain implementations, the vector decal application system 106 casts a ray from a current camera position in the direction of the converted (x, y, z) coordinate point and utilizes the intersection of the ray with the 3D mesh to determine a center for the decal placement region. In one or more embodiments, the vector decal application system 106 further creates a circular region (as the user selected region) utilizing the size of the vector-based decal and/or a user specified scale factor for the selection. Although one or more embodiments herein illustrate the vector decal application system 106 utilizing a circular region, the vector decal application system 106, in some cases, utilizes a variety of region shapes, such as, but not limited to a square region, a rectangular region, and/or a triangular region.

In one or more embodiments, the vector decal application system 106 generates the mesh map by parameterizing a set of faces on a 3D mesh at a region where a vector-based decal will be mapped (based on the user selected region). In some cases, the vector decal application system 106 parameterizes the set of faces on the 3D mesh at the region to generate a UV map as the mesh map. In one or more implementations, the vector decal application system 106 utilizes Geodesic Polar Coordinates on the 3D mesh to generate a UV map (i.e., a mesh map) for the region specified by the user selection on the 3D object. As an example, the vector decal application system 106 parameterizes a 3D mesh at a user selected region to generate a mesh map utilizing Geodesic Polar Coordinates as described in Melvaer et. al., *Geodesic Polar Coordinates on Polygonal Meshes*, Computer Graphics Forum, 31(8):2423-2435, August 2012. In certain instances, the vector decal application system 106 utilizes various approaches to parameterize faces of a 3D mesh to generate a mesh map (e.g., a UV map), such as, but not limited to UV mapping tools, cartographic projection, and/or least squares conformal mapping.

Although one or more embodiments illustrates the vector decal application system 106 parameterizing a region of a 3D object (or 3D mesh) to generate a mesh map specific to the region, in one or more implementations, the vector decal application system 106 generates a mesh map for an entire 3D object (via a 3D mesh of the entire 3D object).

As further shown in act 508 of FIG. 5, in some cases, the vector decal application system 106 utilizes occlusion removal on a parameterized mesh map. For instance, the vector decal application system 106 removes back facing and/or occluded regions from a parameterized mesh. For example, the vector decal application system 106 identifies whether a face (e.g., triangle) is back facing and/or occluded from a 3D mesh. Then, in one or more implementations, the vector decal application system 106 excludes (or removes) the identified back facing faces and/or occluded faces in the mesh map. In particular, in certain cases, removing occluded and/or back facing faces of a 3D mesh during the generating of a mesh map improves and/or ensures correct results of mapping a vector-based decal on the surface of a 3D mesh.

To illustrate, in some embodiments, the vector decal application system 106 identifies whether a face (e.g., a triangle) is back facing in a 3D mesh by identifying whether the face has a normal that opposes a ray from a center of a face to a camera (e.g., a computer graphics camera utilized to reference points and/or surfaces of 3D objects). Indeed, the vector decal application system 106 identifies a face of a 3D mesh as back facing if the face has a normal that opposes a ray from the center of the face to a camera. Upon identifying back facing faces of a 3D mesh, the vector decal application system 106 excludes the identified back facing faces from the parameterized mesh map.

Additionally, in one or more implementations, the vector decal application system 106 identifies whether a face of a mesh map (or 3D mesh) is occluded to exclude occluded faces from the mesh map. In some cases, the occluded faces in a mesh map result from concavities in the 3D mesh. In one or more embodiments, the vector decal application system 106 identifies and removes occluded faces using ray casting.

For example, to identify and remove occluded faces through ray casting, the vector decal application system 106 iterates over each face of a mesh map to identify a corresponding face in a 3D mesh (e.g., reverse mapping). Moreover, in one or more embodiments, the vector decal application system 106 casts a ray from a camera position (e.g., a current camera position) to a centroid of a particular face (after applying a projection matrix to identify the corresponding face in the 3D mesh). In one or more implementations, the vector decal application system 106 determines that a face is not occluded when the ray hits (or intersects) the particular face. In some instances, the vector decal application system 106 determines that a face is occluded when the ray does not hit (or does not intersect) the particular face.

Specifically, the vector decal application system 106 checks if a face is occluded by comparing face index of the original face (towards which a ray is cast) and a face that is hit (or intersected) by the ray. Indeed, if the original face index and the face that is hit by the ray are the same, the vector decal application system 106 keeps the face. Likewise, if the original face index and the face that is hit by the ray are not the same (i.e., the original face is occluded), the vector decal application system 106 removes, from the mesh map, the face corresponding to the original face index. Although one or more embodiments herein illustrate the vector decal application system 106 utilizing ray casting for occlusion removal, the vector decal application system 106, in some embodiments, utilizes a variety of approach to identify and remove occluded faces, such as, but not limited to, normal testing.

In some cases, the vector decal application system 106 cuts or divides partially occluded faces in a mesh map. For instance, the vector decal application system 106 identifies an occluded face of a mesh map and determines portions of the face that are occluded. Then, in one or more embodiments, the vector decal application system 106 subdivides (or cuts) the face to maintain the portion of the face that is visible and to remove the portion of the face that is detected to be occluded.

Figure 6:
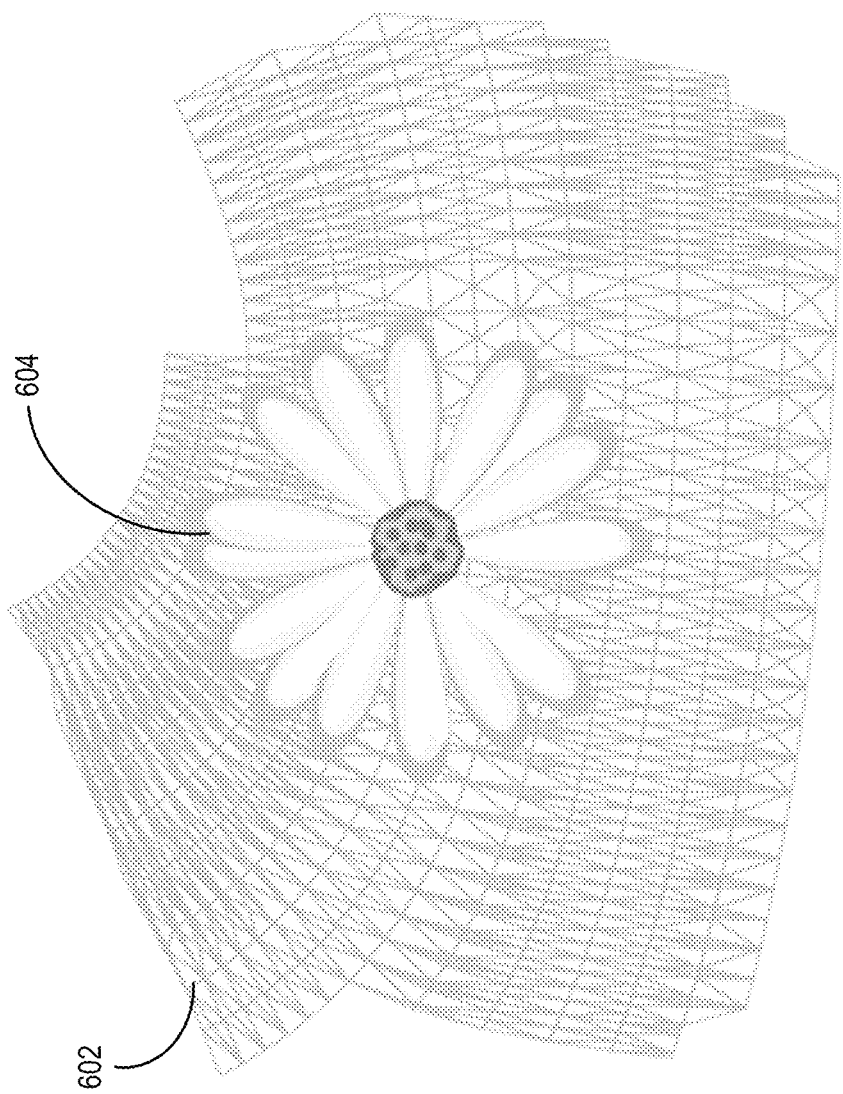
FIG. 6 illustrates a vector decal application system illustrates a vector decal application system positioning a vector-based decal on a mesh map in accordance with one or more implementations.

Furthermore, in some embodiments, the vector decal application system 106 positions a vector-based decal (or decal geometry) onto the mesh map. For example, FIG. 6 illustrates the vector decal application system 106 positioning a decal 604 on a mesh map 602. Indeed, as shown in FIG. 6, the vector decal application system 106 places the decal 604 in the mesh map at a user selected region (from the 3D object) for the decal placement. In some cases, as shown in FIG. 6, the vector decal application system 106 positions the decal 604 within the mesh map centered at the position specified by a user selection. Although one or more embodiments herein illustrates the vector decal application system 106 placing a decal within a mesh map, the vector decal application system 106, in some embodiments, places a decal geometry within the mesh map after generating the decal geometry.

Figure 7:
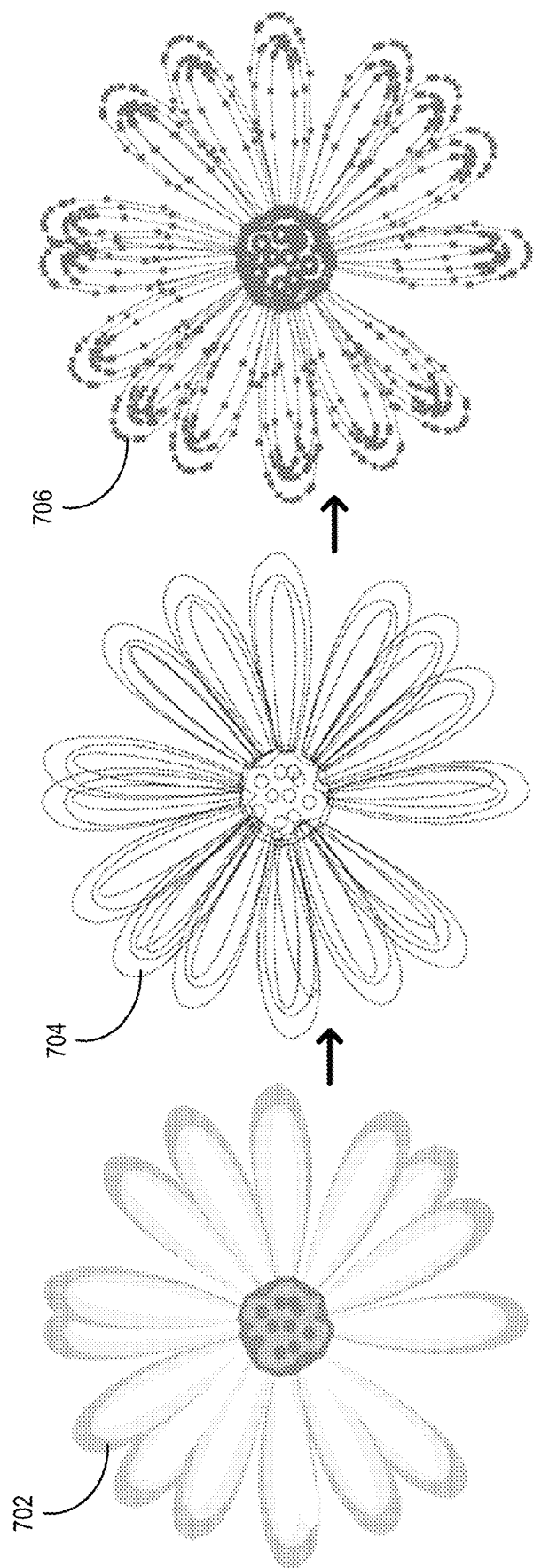
FIG. 7 illustrates a vector decal application system generating a decal geometry for a vector-based decal in accordance with one or more implementations.

As mentioned above, in some cases, the vector decal application system 106 generates a decal geometry for a vector-based decal. For instance, FIG. 7 illustrates the vector decal application system 106 generating a decal geometry for a vector-based decal. Indeed, as shown in FIG. 7, the vector decal application system 106 determines a set of curves 704 from a vector-based decal 702. Then, as further shown in FIG. 7, the vector decal application system 106 converts the set of curves 704 into a decal geometry 706 (e.g., a polyline geometry).

In some cases, the vector decal application system 106 determines a set of curves for a vector-based decal by determining Bezier curve paths from the vector-based decal. In particular, in one or more embodiments, the vector decal application system 106 utilizes points and lines of a vector-based decal to calculate a set of Bezier curve paths that represent smooth, continuous curves that approximate a shape represented in the vector-based image. For example, the vector decal application system 106 utilizes various Bezier curve approaches, such as, but not limited to, Linear Bezier curves, Quadratic Bezier curves, and/or Cubic Bezier curves. Although one or more embodiments herein illustrate the vector decal application system 106 utilizing Bezier curves, the vector decal application system 106, in some instances, determines curve paths of a vector-based decal utilize various approaches, such as, but not limited to, cubic splines, non-uniform rational B-splines, and/or Bernstein's polynomial curves.

Additionally, in one or more embodiments, the vector decal application system 106 converts the set of curves for a vector-based decal to a decal geometry. For instance, the vector decal application system 106 subdivides one or more curves determined from a vector-based decal to generate a set of polylines as a decal geometry (as shown in the decal geometry 706 of FIG. 7). In particular, in one or more embodiments, the vector decal application system 106 subdivides one or more curves to generate a collection of paths that include line segments and vertices to represent details of a vector-based decal within a polyline geometry (as the decal geometry). In one or more instances, the vector decal application system 106 subdivides Bezier curves determined from a vector-based decal to a set of polylines as a polyline geometry (e.g., a decal geometry). For example, the vector decal application system 106 utilizes various Bezier curve approaches to determine or generate a collection of paths for the polyline geometry. Indeed, in one or more embodiments, the vector decal application system 106 determines or generates a collection of paths for the polyline geometry utilizing piecewise linear approximation of Bezier curves as described in Kasper Fischer, *Piecewise Linear Approximation of Bezier Curves*, Oct. 16, 2000.

Figure 8B:
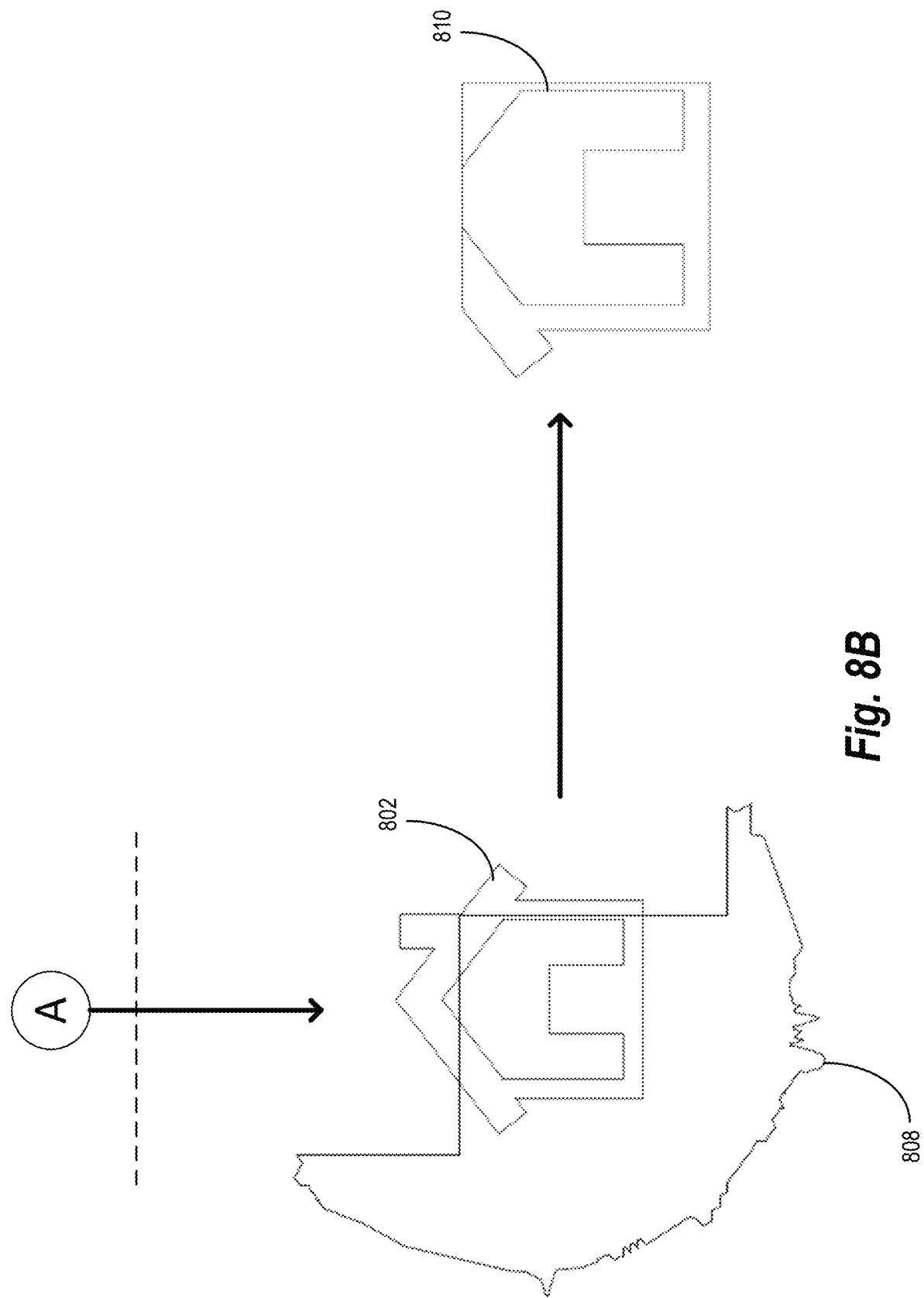

As also mentioned above, in one or more embodiments, the vector decal application system 106 clips a decal geometry of a vector-based decal at boundaries of a mesh map. For example, FIGS. 8A and 8B illustrate the vector decal application system 106 clipping a decal geometry of a vector-based decal using boundaries of a mesh map. In particular, FIGS. 8A and 8B illustrate the vector decal application system 106 identifying boundaries of a mesh map and clipping portions (e.g., one or more polylines) of a decal geometry of a vector-based decal that are positioned outside of the identified boundaries (e.g., clipping one or more polylines).

For instance, as shown in FIG. 8A, the vector decal application system 106 places a decal geometry 802 of a vector-based decal in a mesh map 804 at a user selected region (from the 3D object) for the decal placement (as described in FIG. 6). As further shown in FIG. 8A, the vector decal application system 106 identifies a mesh boundary 806 for the mesh map 804. Subsequently, as shown in FIG. 8A, the vector decal application system 106 utilizes the mesh boundary 806 with a planar graph to identify fundamental cycles in the planar graph to generate a clipping path 808 from the mesh boundary 806.

Moreover, as shown in the transition from FIG. 8A to FIG. 8B, the vector decal application system 106 positions the decal geometry 802 within the clipping path 808 (generated from the identified boundaries of the mesh map 804). Moreover, as shown in FIG. 8B, the vector decal application system 106 utilizes the clipping path 808 to determine portions of the decal geometry 802 to remove. Subsequently, as shown in FIG. 8B, the vector decal application system 106 removes the identified portions of the decal geometry 802 that are outside of the clipping path 808 to generate a clipped decal geometry 810.

In one or more embodiments, the vector decal application system 106 determines one or more boundaries of a mesh map (e.g., holes in a mesh map may result in more than one boundary). To determine (or identify) the boundaries, the vector decal application system 106 traverses edges of the mesh map. For example, in some instances, the vector decal application system 106 traverses edges of the mesh map to find outer edges of the mesh map.

In some cases, a mesh map topology includes multiple edges incident on same vertices. To generate a clipping path that simplifies the boundaries of the mesh map, the vector decal application system 106, in one or more embodiments, constructs a planar graph utilizing the vertices and edges of a mesh map. Subsequently, in one or more implementations, the vector decal application system 106 determines one or more fundamental cycles in the planar graph. Moreover, in some embodiments, the vector decal application system 106 utilizes the union of the fundamental cycles to generate a boundary for the mesh map. In some implementations, the boundary generated from the union of the fundamental cycles is utilized by the vector decal application system 106 as a clipping path.

Moreover, as described above, the vector decal application system 106 utilizes a clipping path (that represents a boundary of a mesh map) to remove portions of a decal geometry (i.e., to clip the decal geometry or polylines). In some cases, upon positioning a decal geometry relative to the clipping path boundary of the mesh map, the vector decal application system 106 utilizes a Boolean subtraction between the polyline geometry of the decal and the mesh map boundary as represented in the clipping path. In one or more implementations, the vector decal application system 106 utilizes the resulting polyline decal from the Boolean subtraction as the clipped decal geometry (which is contained inside boundaries of the mesh map).

Although one or more embodiments herein describe the vector decal application system 106 utilizing Boolean subtraction to clip a decal geometry, the vector decal application system 106, in certain instances, utilizes various approaches, such as, but not limited to line clipping, shortest path algorithms, curve clipping, pathfinder operations, and/or Bezier clipping.

For instance, in one or more implementations, the vector decal application system 106 generates a clipping path of the boundaries of the mesh map (e.g., that may include multiple edges incident on the same vertices) to clip the geometry decal by identifying intersections of the mesh map boundary with the decal geometry boundary and utilizing a shortest path algorithm (e.g., shortest path clipping). For instance, the vector decal application system 106 identifies one or more intersection points between one or more boundaries of the decal geometry and one or more mesh boundaries of the mesh map. Then, the vector decal application system 106 determines one or more shortest paths between the one or more intersection points (on one or more boundaries of the decal geometry) and utilizes the shortest paths to remove one or more portions or sections of the decal geometry that are not within the boundary of the mesh map (e.g., by closing the one or more boundaries of the decal geometry at the intersection points that represent the shortest path).

In some embodiments, the vector decal application system 106 utilizes Djikstra's algorithm to determine the shortest path between multiple pairings of the one or more intersection points between one or more boundaries of the decal geometry and one or more mesh boundaries of the mesh map. In some cases, the vector decal application system 106 utilizes various algorithms to determine a shortest path between one or more intersection points between one or more boundaries of the decal geometry and one or more mesh boundaries of the mesh map, such as, but not limited to, Bellman-Ford's algorithm, best-first graph search algorithm, and/or Djikstra's algorithm.

Figure 8C:
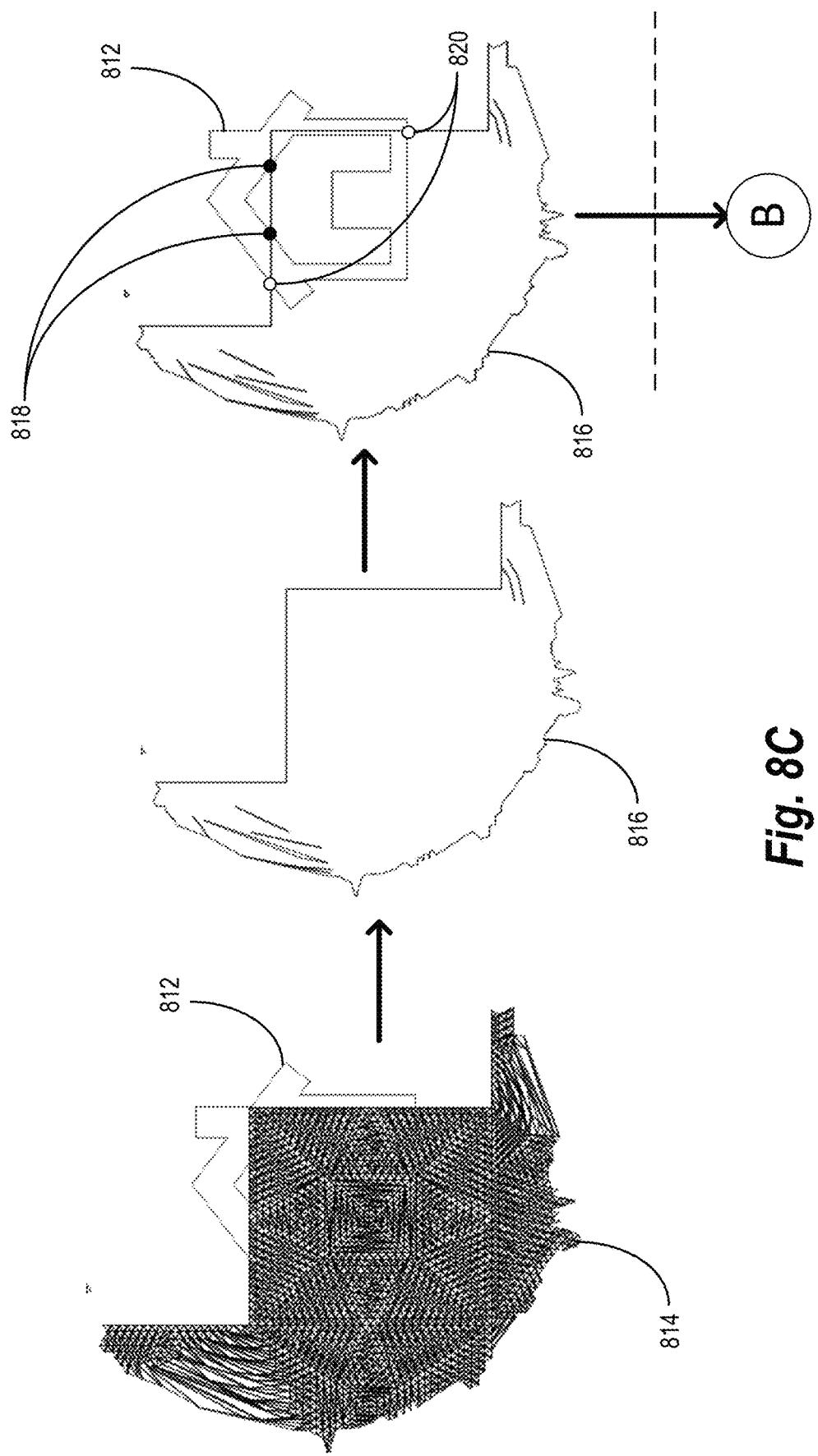
Figure 8D:
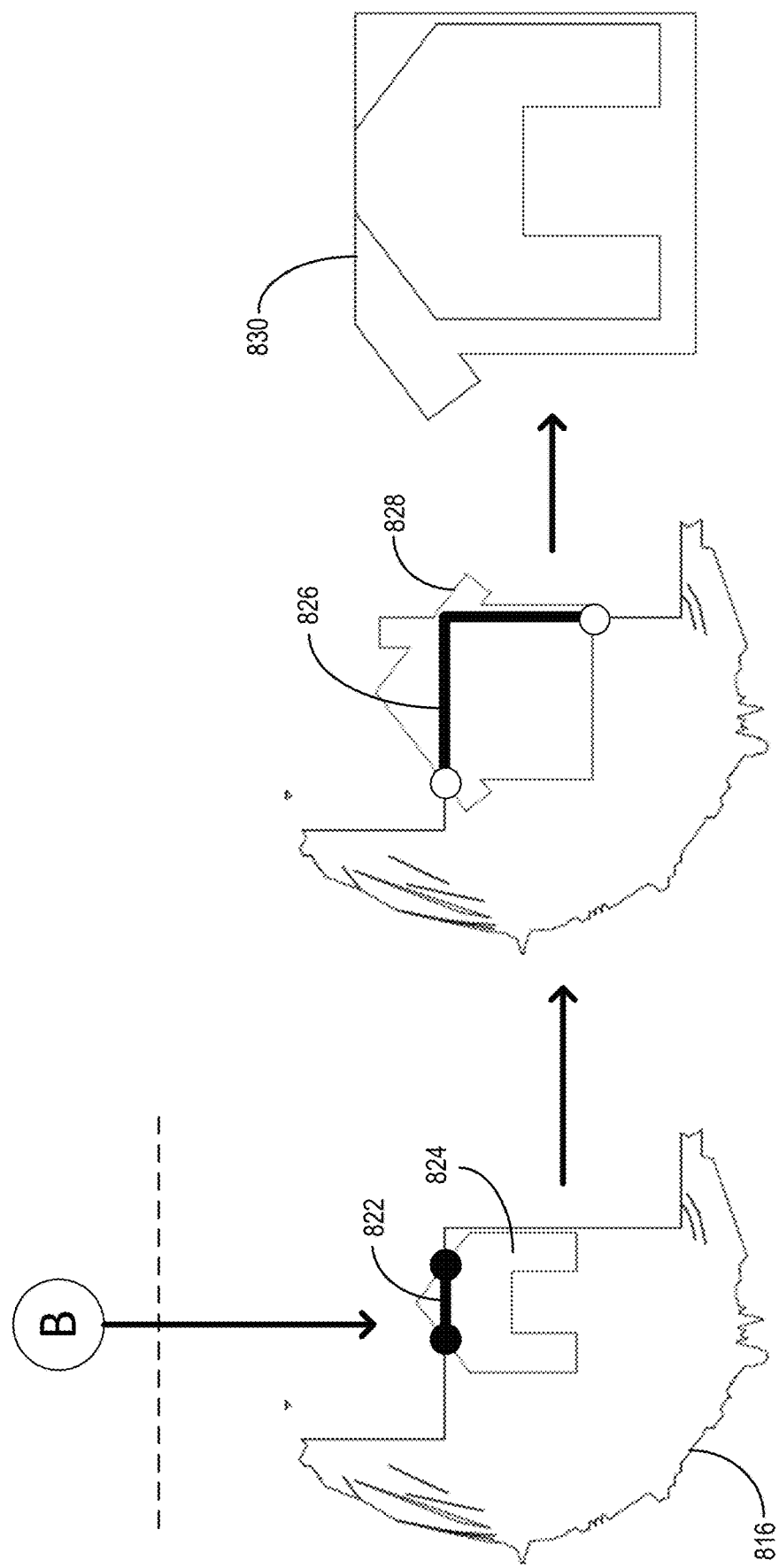

As an example, FIGS. 8C and 8D illustrate the vector decal application system 106 clipping a geometry decal by identifying intersections of a mesh map boundary with a decal geometry boundary and utilizing a shortest path algorithm. For instance, as shown in FIG. 8C, the vector decal application system 106 places a decal geometry 812 of a vector-based decal in a mesh map 814 at a user selected region (from the 3D object) for the decal placement (as described in FIG. 6). Moreover, as shown in FIG. 8C, the vector decal application system 106 identifies a mesh boundary 816 for the mesh map 814. Then, as shown in FIG. 8C, the vector decal application system 106 identifies intersection points 818 and intersection points 820 between boundaries of the decal geometry 812 and the mesh boundary 816.

As shown in the transition from FIG. 8C to FIG. 8D, the vector decal application system 106 identifies a shortest path 822 for a first boundary 824 using the intersection points 818 of the decal geometry 812 (from FIG. 8C). Moreover, as also shown in the transition from FIG. 8C to FIG. 8D, the vector decal application system 106 identifies a shortest path 826 for a second boundary 828 using the intersection points 820 of the decal geometry 812 (from FIG. 8C). Additionally, as shown in FIG. 8D, the vector decal application system 106 utilizes the shortest path 822 and the shortest path 826 to remove portions or sections of the decal geometry 812 (from FIG. 8C) that are not within the mesh boundary 816 to generate a clipped decal geometry 830.

As mentioned above, in one or more embodiments, the vector decal application system 106 maps a decal geometry of a vector-based decal to a mesh map. In one or more embodiments, to map the decal geometry to a mesh map, the vector decal application system 106 adds vertices to the decal geometry at the line segment intersections with the mesh map. The mapping of the decal geometry to the mesh map (via the introduction of vertices at the line segment intersections) subdivides the curves on the decal geometry to ensure accuracy and sufficient degree of freedom when projecting the decal geometry to one or more faces (and offsets) in the 3D mesh. For instance, FIGS. 9A and 9B illustrate the vector decal application system 106 mapping a decal geometry of a vector-based decal to a mesh map by introducing vertices to the decal geometry at intersections between line segments of the decal geometry and the mesh map.

Figures 9A, 9B:
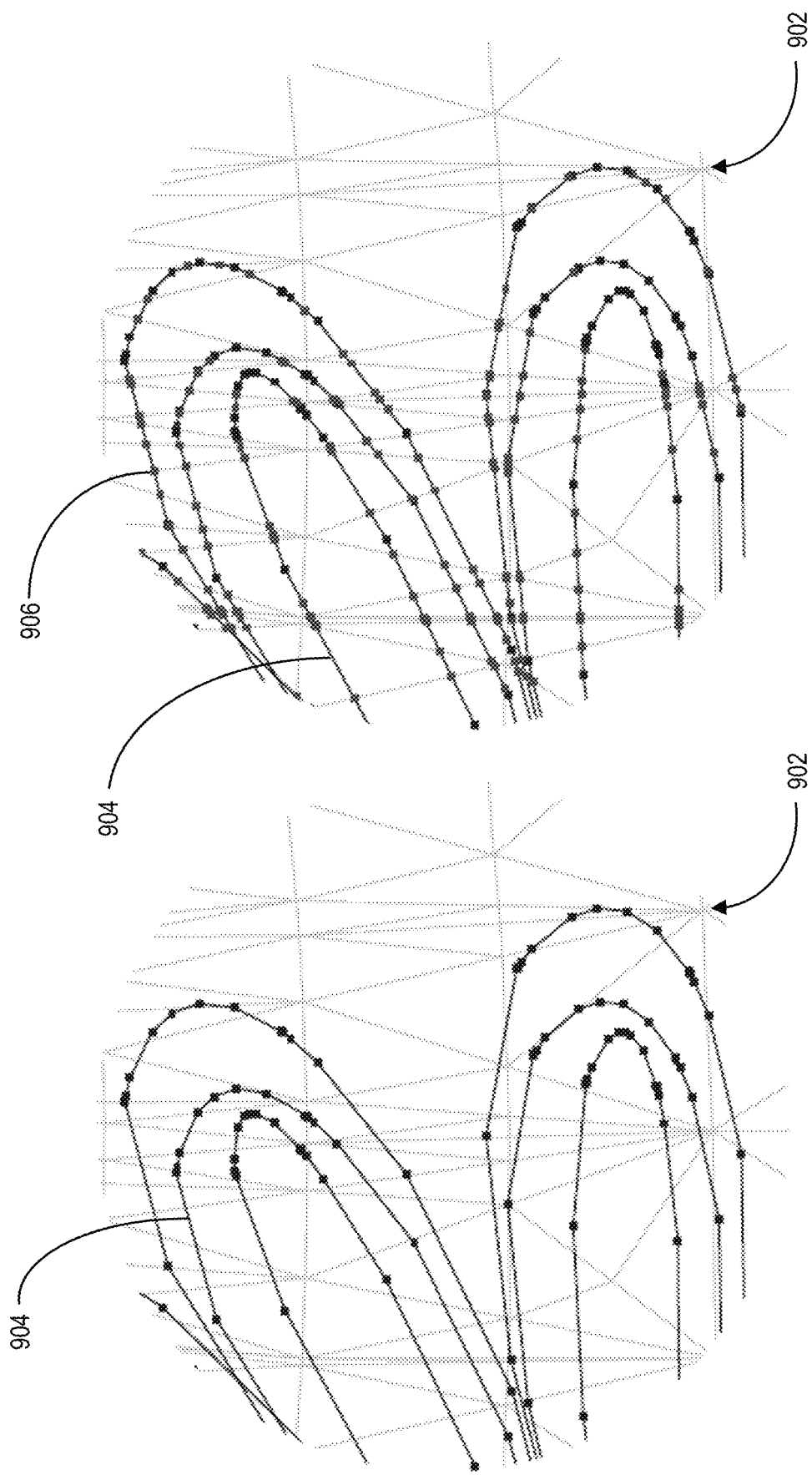
FIGS. 9A and 9B illustrate a vector decal application system mapping a decal geometry of a vector-based decal to a mesh map in accordance with one or more implementations.

For instance, as shown in FIG. 9A, the vector decal application system 106 positions a decal geometry 904 onto a mesh map 902 (as described in FIG. 6). Additionally, as shown in the transition from FIG. 9A to FIG. 9B, the vector decal application system 106 identifies intersections between line segments of the decal geometry 904 and the mesh map 902 to add vertices on the decal geometry at the intersections. For instance, as shown in FIG. 9B, the vector decal application system 106 adds a vertex 906 between an intersection of a line segment of the decal geometry 904 and a line segment of the mesh map 902. Indeed, as illustrated in the transition from FIG. 9A to FIG. 9B, the vector decal application system 106 adds multiple vertices at identified intersections between the line segments of the decal geometry 904 and the mesh map 902.

In one or more implementations, the vector decal application system 106 identifies one or more intersections between line segments of a decal geometry and line segments of a mesh map. For instance, the vector decal application system 106 traverses one or more line segments (or edges) d of a decal geometry and one or more line segments (or edges) e of a mesh map to identify a set of intersections (d,e). Then, the vector decal application system 106 adds new vertices at the set of intersections to split the one or more line segments d of the decal geometry at the set of intersections.

In some cases, the vector decal application system 106 utilizes tree structure approaches to identify intersections and subdivide decal geometries at the intersections. To illustrate, in some embodiments, the vector decal application system 106 utilizes a bounded volume hierarchy (BVH) to identify intersections between line segments of a decal geometry and line segments of a mesh map to introduce vertices at the intersections on the decal geometry. Indeed, in one or more additional or alternative embodiments, the vector decal application system 106 utilizes various intersection and subdivision approaches, such as, but not limited to, octrees hierarchies and/or k-dimensional trees (K-d trees).

Figure 10:
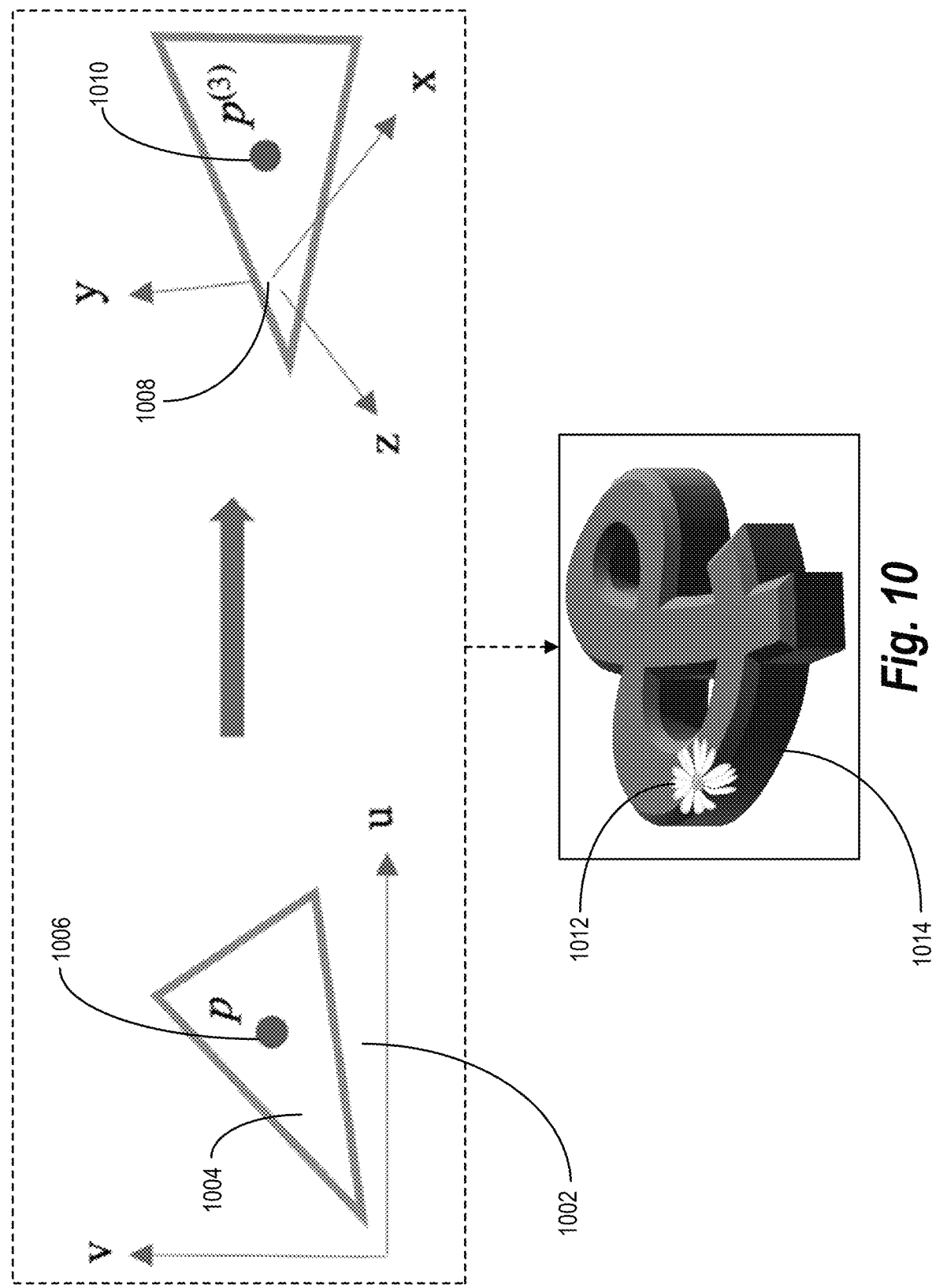
FIG. 10 illustrates a vector decal application system applying a vector-based decal to a 3D by projecting a decal geometry into three-dimensions in accordance with one or more implementations.

Furthermore, as also mentioned above, the vector decal application system 106 applies a vector-based decal to a 3D object by lifting and projecting vertices of a decal geometry of the vector-based decal into three-dimensions after mapping the decal geometry to a mesh map of the 3D object. For example, FIG. 10 illustrates the vector decal application system 106 applying a vector-based decal to a 3D object through a decal geometry lift and projection into three-dimensions. Specifically, FIG. 10 illustrates the vector decal application system 106 utilizing a mapped decal geometry and a parameterized mesh map to lift and project a vertex of the mapped decal geometry into three dimensions to apply a vector-based decal onto a surface of a 3D object.

As shown in FIG. 10, the vector decal application system 106 identifies a coordinate p (e.g., a barycentric coordinate) for a vertex 1006 of a decal geometry with respect to a face 1004 of a mesh map 1002 (e.g., a parameterized UV map of a 3D mesh as described in FIG. 5). Then, as shown in FIG. 10, the vector decal application system 106 determines a reverse mapping of the face 1004 to three dimensions 1008. In addition, as shown in FIG. 10, the vector decal application system 106 utilizes the reverse mapping of the face 1004 in the three dimensions 1008 to project the barycentric coordinates p of the vertex 1006 into three dimensions as a projected vertex 1010 with three-dimensional coordinates ($p^{(3)}$). The three-dimensional coordinates of the projected vertex 1010 lifts corresponding edges of the decal geometry into three dimensions to conform to a 3D surface of a 3D mesh of the mesh map 1002.

As further shown in FIG. 10, the vector decal application system 106 utilizes projected vertices of the decal geometry (such as the projected vertex 1010) to apply the decal geometry on a 3D mesh representing a surface of a 3D object 1014. As illustrated in FIG. 10, the vector decal application system 106 utilizes the reverse mapped vertices of the decal geometry in three-dimension to corresponding points in a 3D mesh to apply the decal geometry as a vector-based decal 1012 on the surface of the 3D object 1014 (e.g., on various 2D planes of the surface of the 3D object 1014). Indeed, as shown in FIG. 10, the vector decal application system 106 utilizing the projected three-dimensional vertices of the decal geometry, applies the corresponding vector-based decal such that the vector-based decal applies to various surfaces (having various offsets) on the 3D object.

In one or more implementations, the vector decal application system 106 lifts and projects vertices of a decal geometry into three dimensions through reverse mapping. For instance, the vector decal application system 106 identifies (and stores in a projection matrix) one or more local barycentric coordinates of one or more vertices (or points) of the decal geometry (that is mapped on the mesh map as described in FIGS. 9A and 9B) with respect to vertices of enclosing faces on the mesh map. Furthermore, the vector decal application system 106 computes the reverse UV mapping on the faces of the mesh map. Subsequently, the vector decal application system 106 utilizes the reverse mapping of the faces of the mesh map and the one or more local barycentric coordinates of the one or more decal geometry vertices (e.g., retrieved from the projection matrix) to project the one or more decal geometry vertices into three dimensions. Due to the line segments of the decal geometry being contained within mesh map faces and the lifting of vertices maps straight lines to straight lines, the vector decal application system 106 creates a 3D decal geometry that conforms to a 3D surface of a 3D mesh (of the 3D object).

Indeed, in one or more implementations, the vector decal application system 106, for each vertex p on a subdivided decal geometry in a face f (e.g., a triangular face) of the mesh map (e.g., UV map), computes barycentric coordinates of p in the face f. Then, the vector decal application system 106 utilizes the barycentric coordinates of p to reverse UV map p to corresponding points in a 3D mesh (e.g., a 3D triangle mesh) for the mesh map. In some cases, the vector decal application system 106 utilizes a k-dimensional tree (k-D tree) on the mesh map faces to compute a reverse UV mapping. In one or more implementations, the vector decal application system 106 utilizes various space-partitioning data structures for reverse UV mapping, such as, but not limited to, octrees and/or vantage-point trees.

In one or more embodiments, the vector decal application system 106 projects 3D decal geometry vertices to a surface of a 3D object to display a corresponding vector-based decal on the surface of the 3D object. For example, the vector decal application system 106 utilizes camera projection to project one or more vertices of a 3D decal geometry (i.e., decal geometry vertices reverse mapped or lifted into three dimensions) on one or more surfaces of the 3D object (e.g., via various 2D planes of the one or more surfaces of the 3D object). In some cases, the 3D decal geometry is lifted and projected onto the one or more surfaces of the 3D object as a separate layer from the 3D object.

Indeed, the vector decal application system 106 utilizes the resulting 3D decal geometry projected onto the 3D object to render (or display) the vector-based decal corresponding to the decal geometry. For example, the vector decal application system 106 utilizes camera projection to display and/or position visual attributes of the vector-based decal (e.g., shape, color, shade, transparency) at appropriate locations of the 3D decal geometry (projected to the one or more surfaces of the 3D object). Accordingly, in one or more embodiments, the vector decal application system 106 applies the vector-based decal onto the 3D object to display the 3D object with the vector-based decal (at a user selected region).

In some cases, the vector decal application system 106 further reconstructs curve segments of the decal geometry upon applying the decal geometry (or its corresponding vector-based decal) onto a 3D object. For instance, in one or more embodiments, after positioning and projecting a decal geometry onto a 3D object, the vector decal application system 106 fits curves of the decal geometry (e.g., for geometry introduced by polylines) to generate a compact representation of the vector-based decal. In particular, the vector decal application system 106, in one or more implementations, utilizes vertices of the decal geometry to identify a curve that best fits a set of vertices in the decal geometry to reconstruct the curves of the decal geometry. For example, the vector decal application system 106 reconstructs curves of the decal geometry utilizing curve fitting as described in Phogat et. al., *Skinning Vector Graphics with GANs*, ACM SIGGRAPH 2019 Posters, July 2019. In one or more embodiments, the vector decal application system 106 utilizes various curve fitting approaches, such as, but not limited to, Hermite interpolation and/or orthogonal distance fitting.

In some cases, the vector decal application system 106 utilizes the mappings between a determined Bezier curve paths of the vector-based decal and the decal geometry (e.g., the polyline geometry) to reconstruct curves in the projected decal geometry. For example, the vector decal application system 106 maps the added vertices of the decal geometry (e.g., the vertices added to the decal geometry during the mapping to a mesh map as described in FIGS. 9A and 9B) to the original Bezier curve paths. Indeed, in certain instances, the vector decal application system 106 creates additional Bezier geometry in which added vertices cause an original Bezier segment to split into two connected segments. In some cases, the vector decal application system 106 adds the additional vertices of the decal geometry to the original Bezier curve paths by using length based fractions. Subsequently, in one or more implementations, the vector decal application system 106 reconstructs curves using the additional Bezier geometry with a curve fitting approach (as described above).

In addition, as mentioned above, in one or more embodiments, the vector decal application system 106 applies vector-based decals to 3D objects that are capable of modification and/or applicable to multiple surfaces of 3D objects. For instance, FIGS. 11A-11G illustrate the vector decal application system 106 applying a vector-based decal to a 3D object and enabling modifications to the vector-based decal (e.g., as a separate layer). For instance, FIGS. 11A-11G illustrate the vector decal application system 106 modifying an applied vector-based decal through movements of the vector-based decal, resizing of the vector-based decal, and various other display features of the vector-based decal.

Figure 11A:
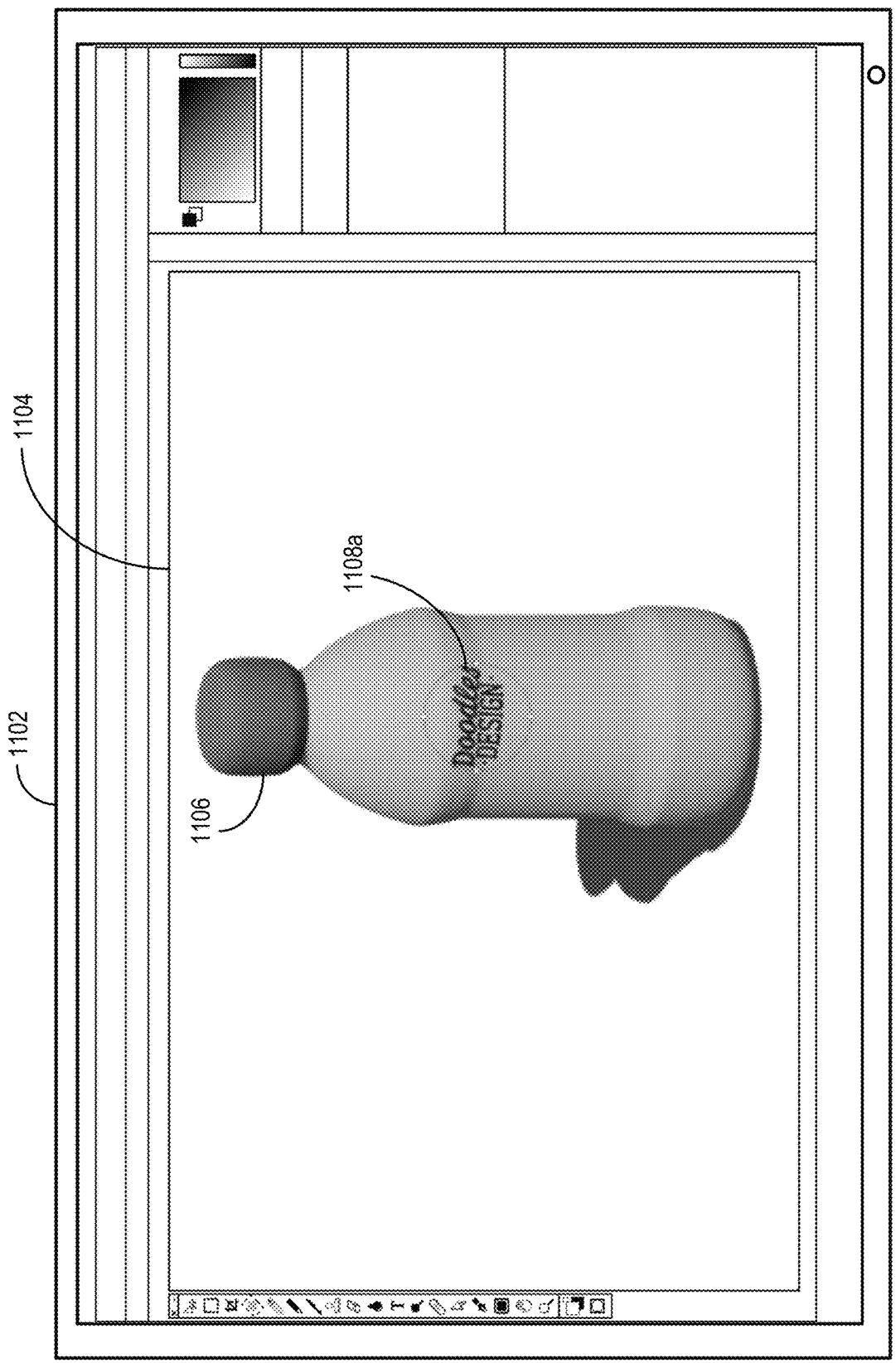
FIGS. 11A-11G illustrate a vector decal application system modifying an applied vector-based decal and display features of the vector-based decal in accordance with one or more implementations.

For instance, as shown in FIG. 11A, the vector decal application system 106 applies a vector-based decal 1108*a* on a 3D object (displayed within a graphical user interface 1104 of a client device 1102) in accordance with one or more implementations herein. Then, as shown in the transition from FIG. 11A to FIG. 11B, the vector decal application system 106 receives a user selection (e.g., a click and drag interaction and/or destination selection) to move the vector-based decal 1108*a* to an additional position such that the vector decal application system 106 applies the vector-based decal 1108*b* at the newly selected position (i.e., moving the vector-based decal). As also shown in FIG. 11B, the vector decal application system 106 rotates the vector-based decal 1108*b* based on a user selection to rotate the vector-based decal 1108*a*.

In some cases, the vector decal application system 106 reiterates one or more of the vector-based decal application steps (as described above) to apply the vector-based decal at the newly selected position on the 3D object 1106. For example, the vector decal application system 106 receives a user interaction to relocate the vector-based decal to an updated region of the 3D object. Then, in certain instances, the vector decal application system 106 generates an additional mesh map for the updated region and generates a decal geometry with new (or additional) vertices mapped to additional intersections between line segments of the decal geometry and the additional mesh map to project the new vertices of the decal geometry in three-dimensions at the updated region corresponding to the additional mesh map (as described above).

Additionally, in some cases, the vector decal application system 106 reiterates one or more of the vector-based decal application steps (as described above) to rotate the vector-based decal on the 3D object 1106. For example, the vector decal application system 106 receives a user interaction to rotate the vector-based decal on a region of the 3D object. Subsequently, in some implementations, the vector decal application system 106 generates a rotated decal geometry with new (or additional) vertices mapped to additional intersections between line segments of the rotated decal geometry and the mesh map to project the new vertices of the rotated decal geometry in three-dimensions at the region corresponding to the mesh map (as described above).

Figure 11B:
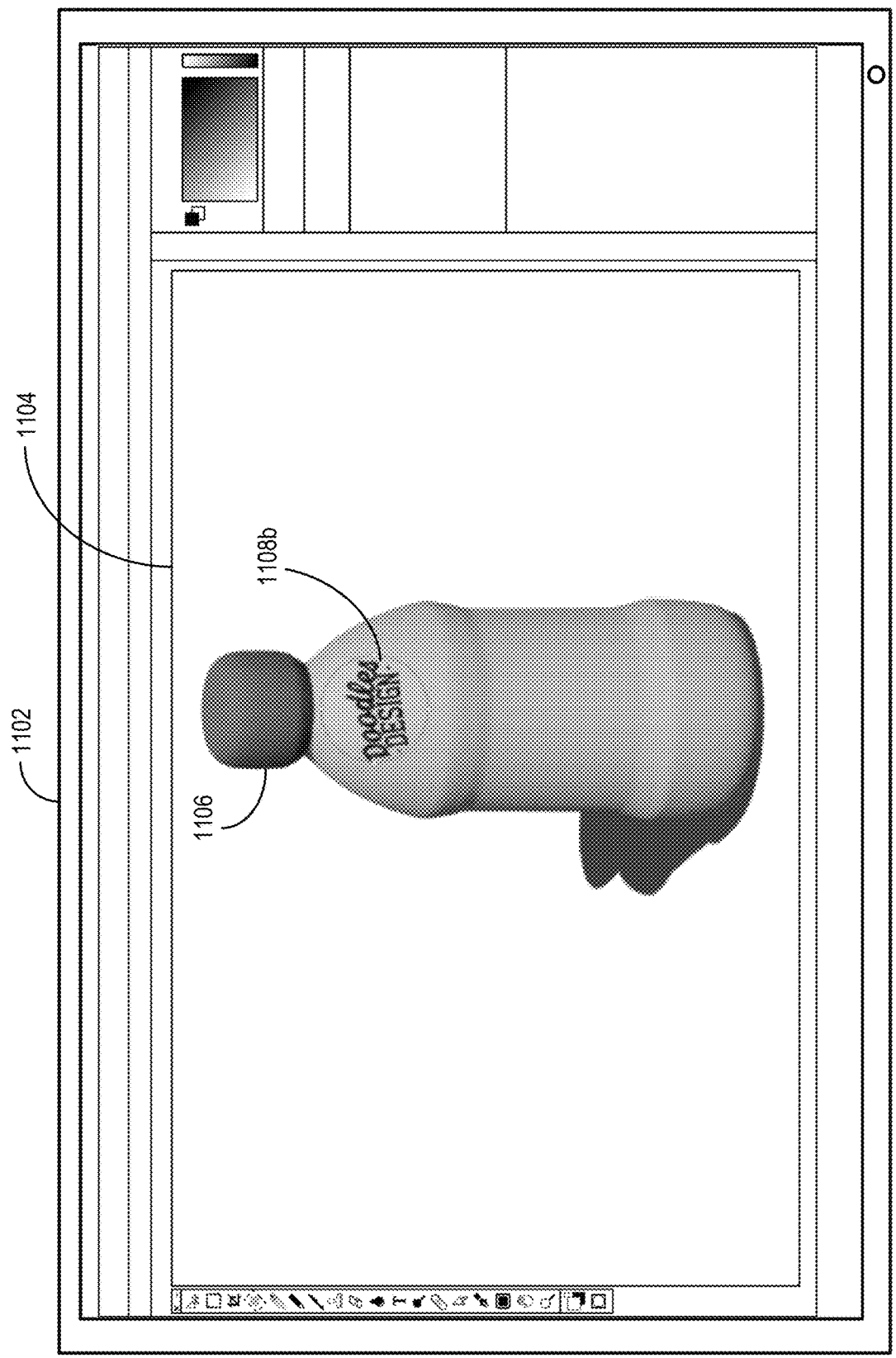
Figure 11C:
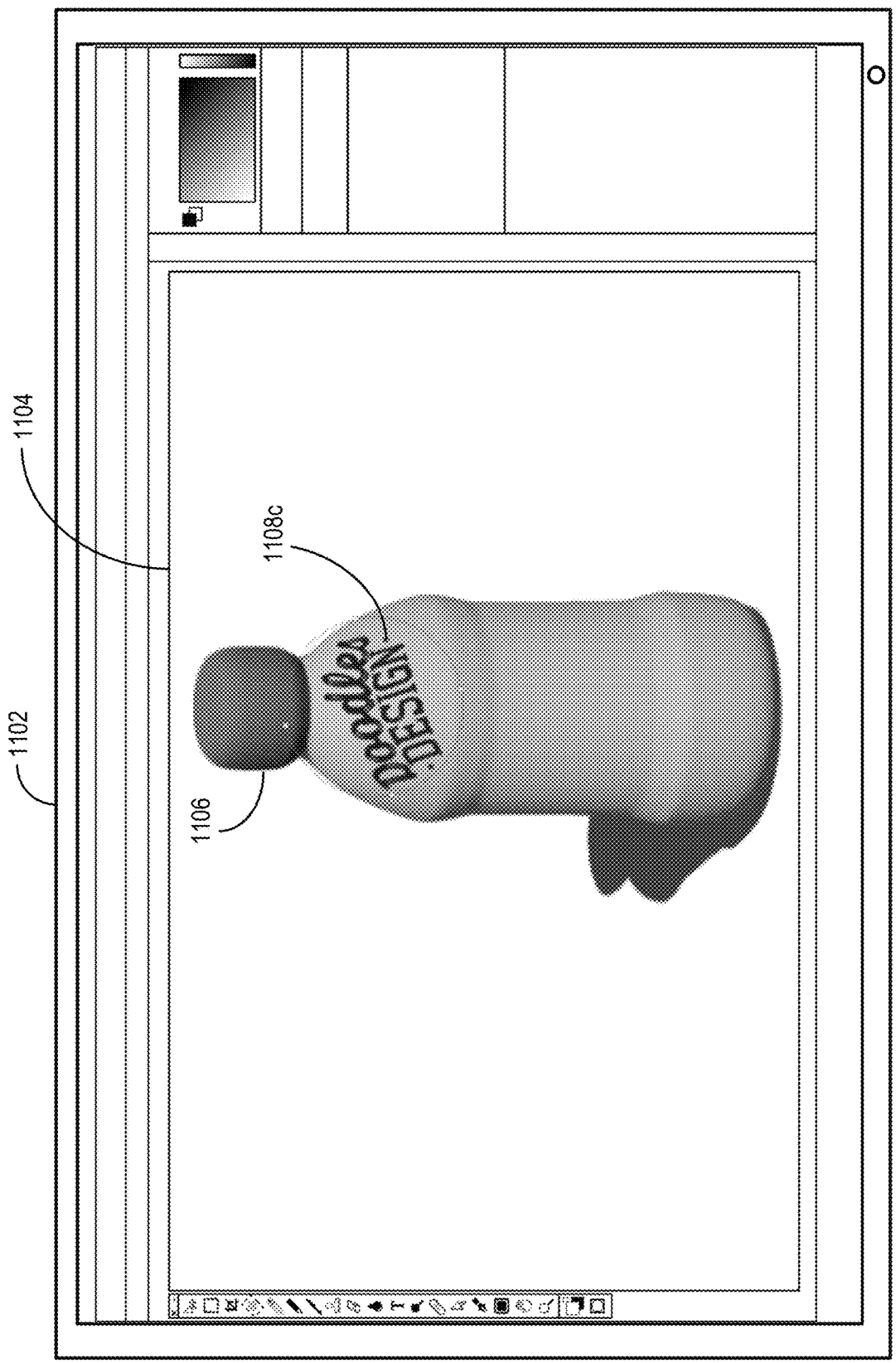
Figure 11D:
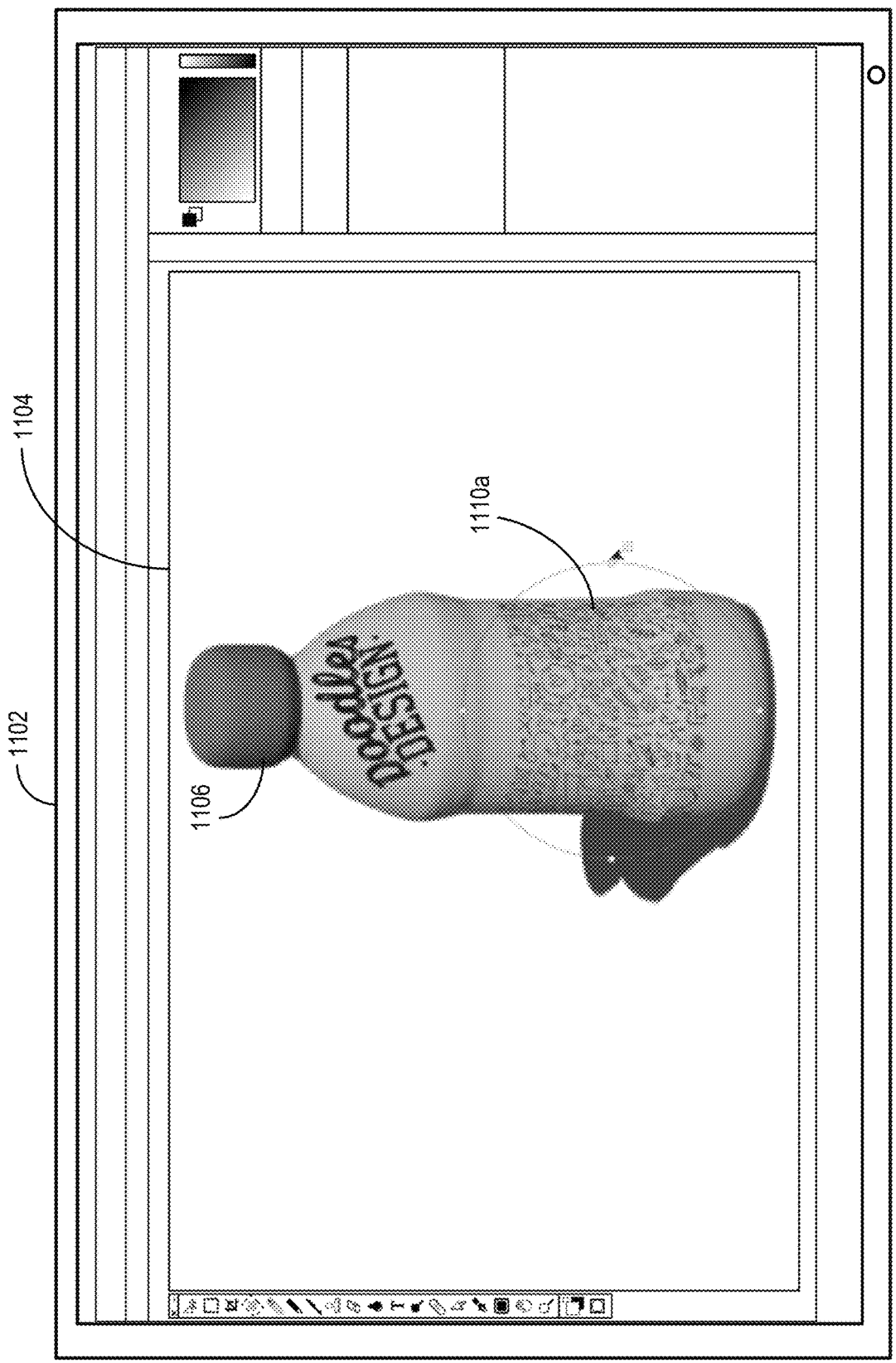
Figure 11E:
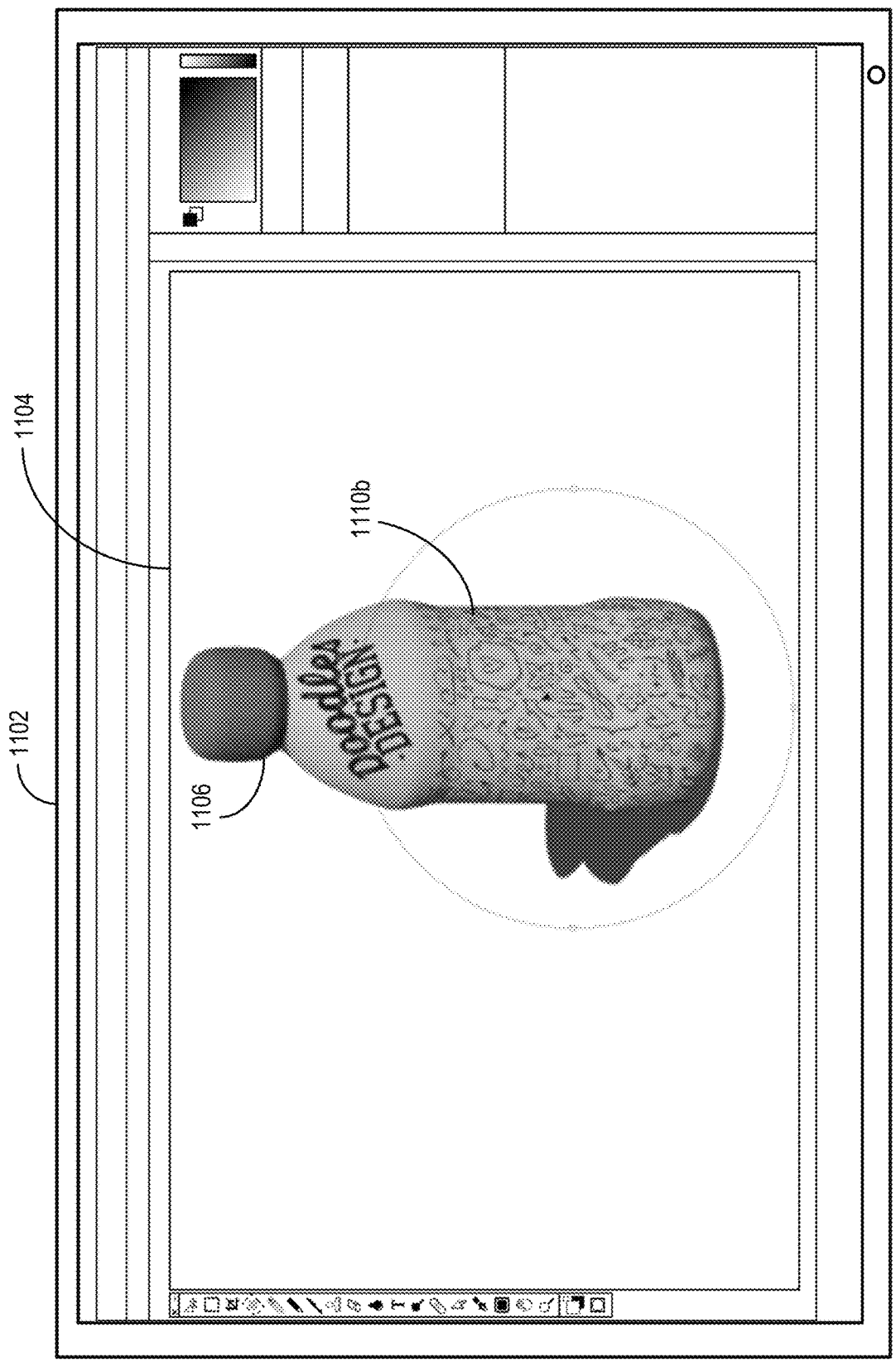

As further shown in the transition from FIG. 11B to FIG. 11C, the vector decal application system 106 receives a user selection (e.g., a click and drag interaction, a key command, a text input) to resize the vector-based decal 1108*b*. As shown in FIG. 11C, the vector decal application system 106 resizes the vector-based decal 1108*b* as an applied vector-based decal 1108*c* (e.g., a larger sized decal). In one or more embodiments, the vector decal application system 106 resizes a vector-based decal to larger and/or smaller sizes. Likewise, as shown in FIG. 11D and FIG. 11E, the vector decal application system 106 applies an additional vector-based decal 1110*a* on the 3D object 1106 and, upon receiving a user request to resize, resizes the vector-based decal 1110*a* to apply a vector-based decal 1110*b*.

In certain instances, the vector decal application system 106 reiterates one or more of the vector-based decal application steps (as described above) to apply the vector-based decal as a resized vector-based decal on the 3D object 1106. For example, the vector decal application system 106 receives a user interaction to resize the vector-based decal. Then, in certain instances, the vector decal application system 106 generates a resized decal geometry with new (or additional) vertices mapped to additional intersections between line segments of the resized decal geometry and the mesh map (or a resized mesh map) to project the new vertices of the resized decal geometry in three-dimensions at the region corresponding to the mesh map (as described above).

Figure 11F:
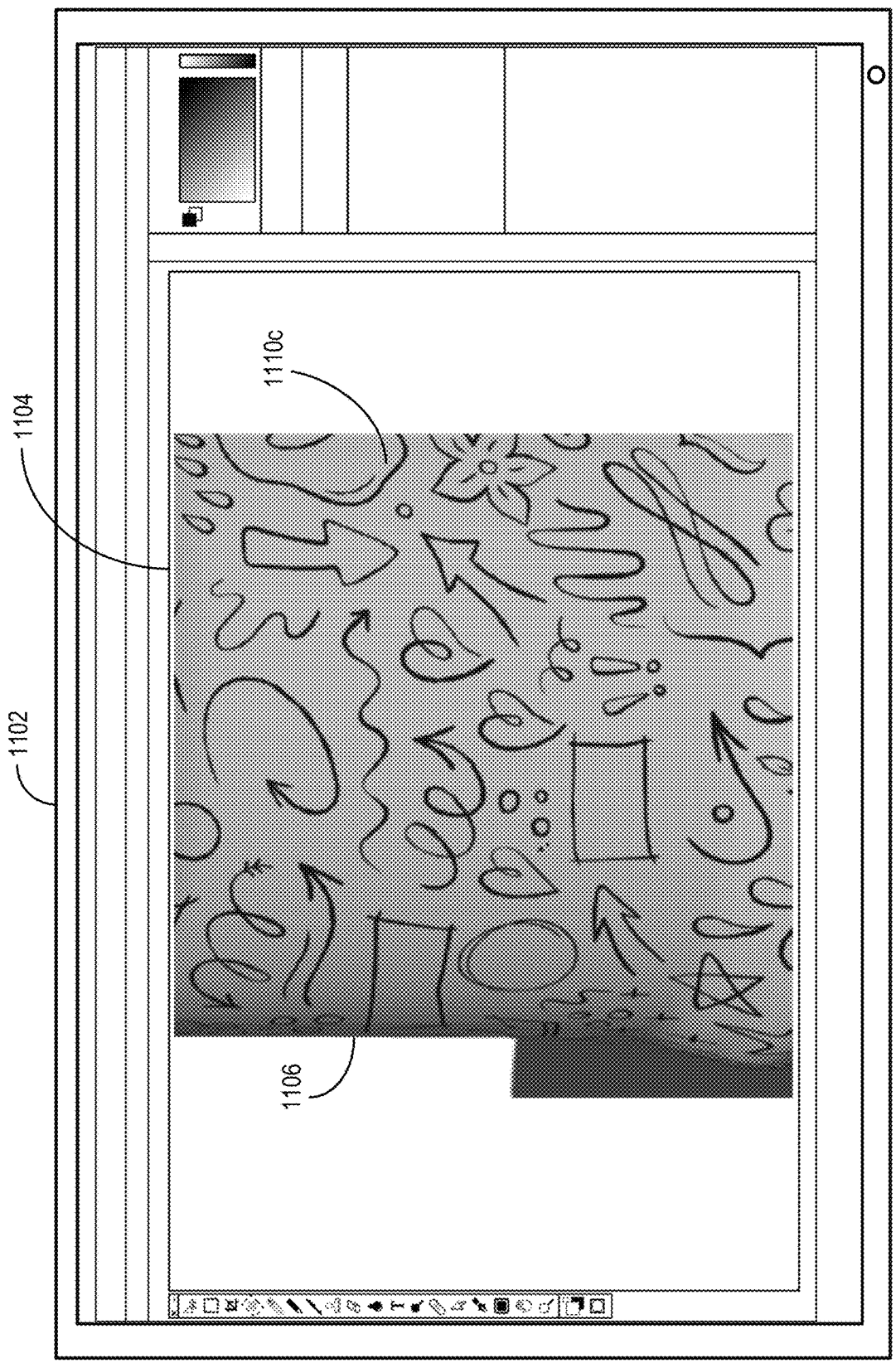

In one or more implementations, as described above, the vector decal application system 106 applies the vector-based decal 1110b such that the applied vector-based decal is resolution independent and does not experience a loss of detail (in contrast to rasterized decals). For instance, the vector decal application system 106 applies vector-based decals that do not lose detail and are clear when a view of a 3D object is zoomed in. To illustrate, as shown in the transition from FIG. 11E to FIG. 11F, the vector decal application system 106 receives a user interaction to zoom in on the 3D object 1106. As shown in FIG. 11F, the zoomed in view of the vector-based decal 1110c maintains detail of the vector-based decal 1108b.

Figure 11G:
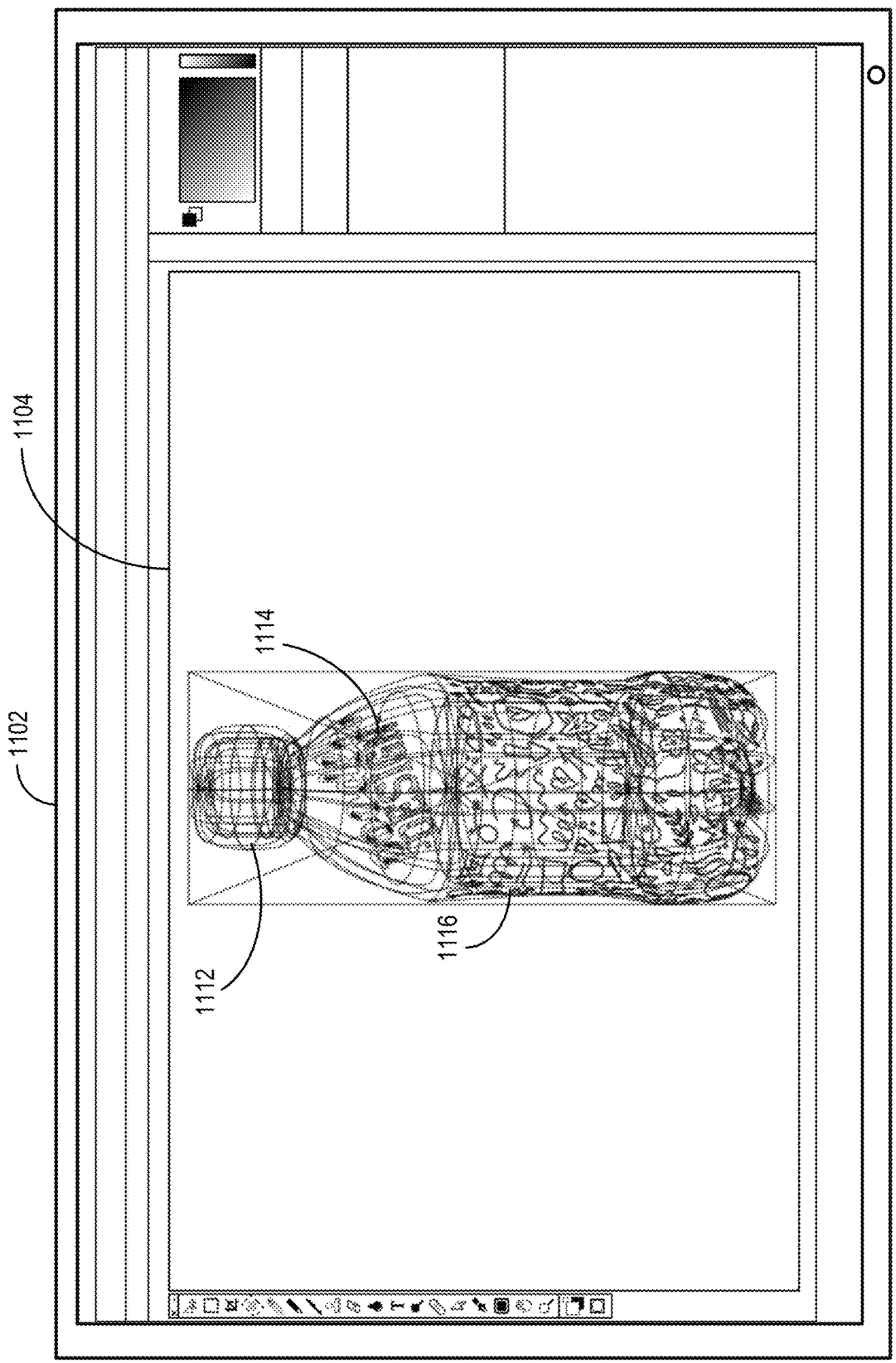

Furthermore, in some cases, the vector decal application system 106 displays various view types of a 3D object and vector-based decals as the vector-based decals are applied to be resolution independent and as separate layers. In certain implementations, the vector decal application system 106 displays wire frame views of 3D objects and one or more vector-based decals. For instance, as shown in FIG. 11G, the vector decal application system 106 displays, within the graphical user interface 1104 on the client device 1102, a first wire frame view 1112 for the 3D object, a second wire frame view 1114 for a vector-based decal, and a third wire frame view 1116 for an additional vector-based decal.

In some instances, the vector decal application system 106 applies various modifications to vector-based decals applied to 3D objects. For example, as mentioned above, the vector decal application system 106 applies effects and/or blend mode operations. For instance, the vector decal application system 106 modifies a transparency of a vector-based decal applied to a 3D object. Indeed, the vector decal application system 106 applies various effects, blend mode operations, and/or other functionalities on a vector-based decal, such as, but not limited to, a dissolve blending mode, a lighten blending mode, hue operations, saturation operations, color operations, luminosity operations, shadow operations, converting to smart objects, copying layers. In some cases, the vector decal application system 106 converts the applied vector-based decal into a busy path to increase the editability of the decal.

Figure 12A:
FIGS. 12A-12E illustrate exemplary applications of vector-based decals to various 3D objects by a vector decal application system in accordance with one or more implementations.
Figure 12A:
Figure 12A:
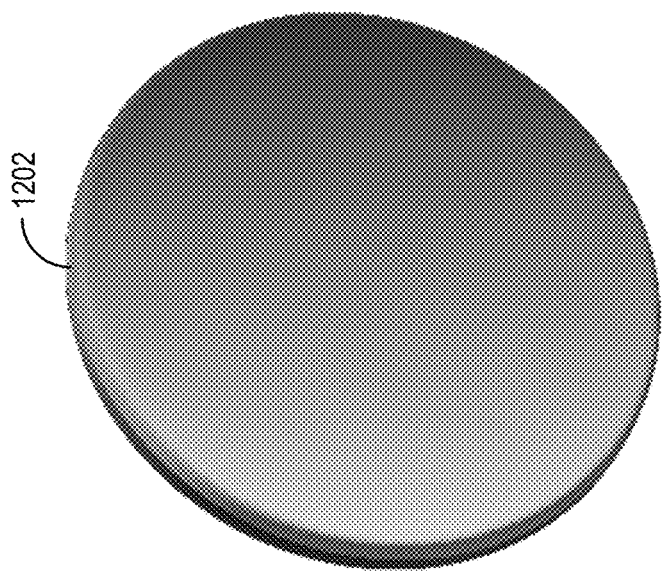
Figure 12B:
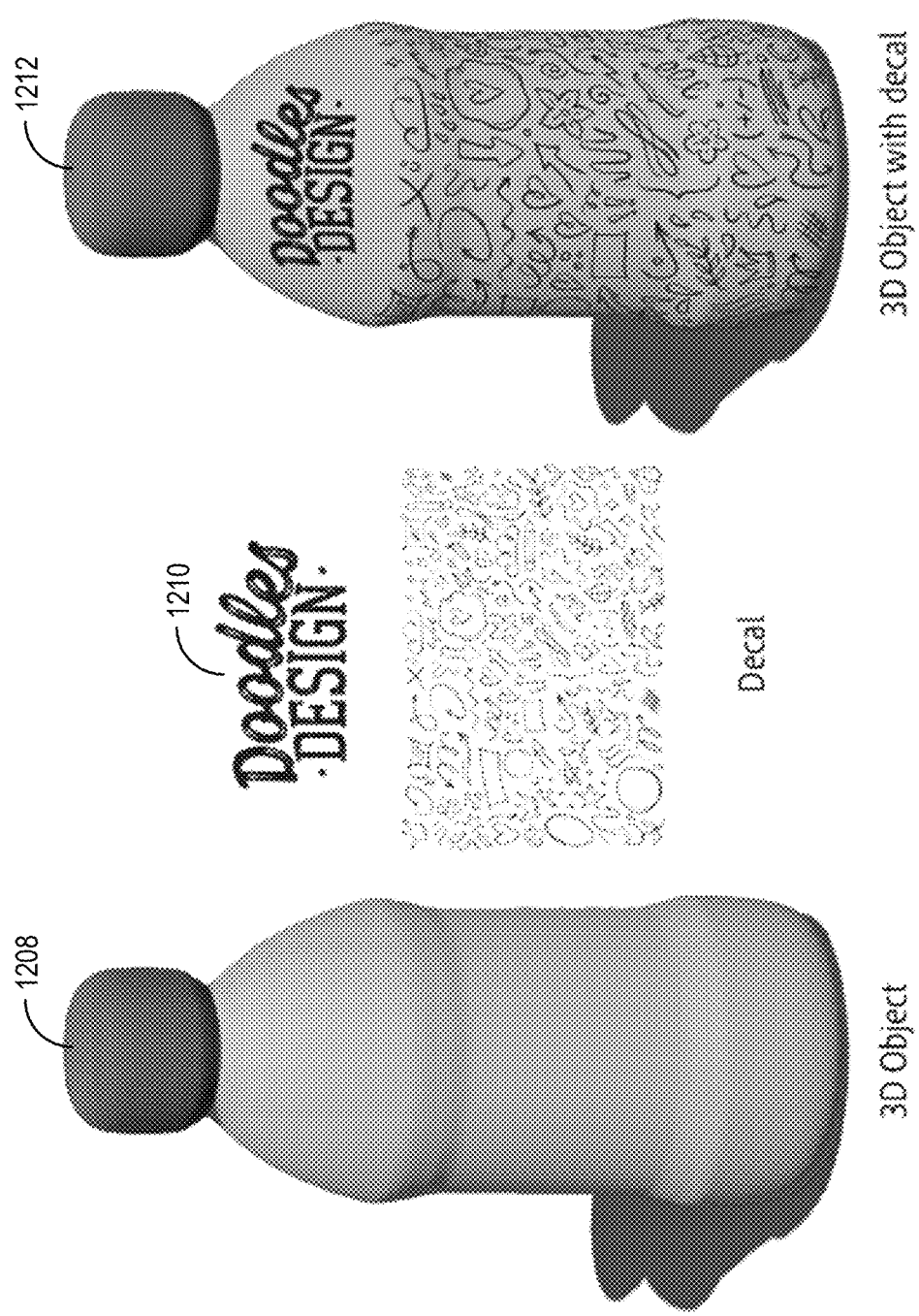
Figure 12C:
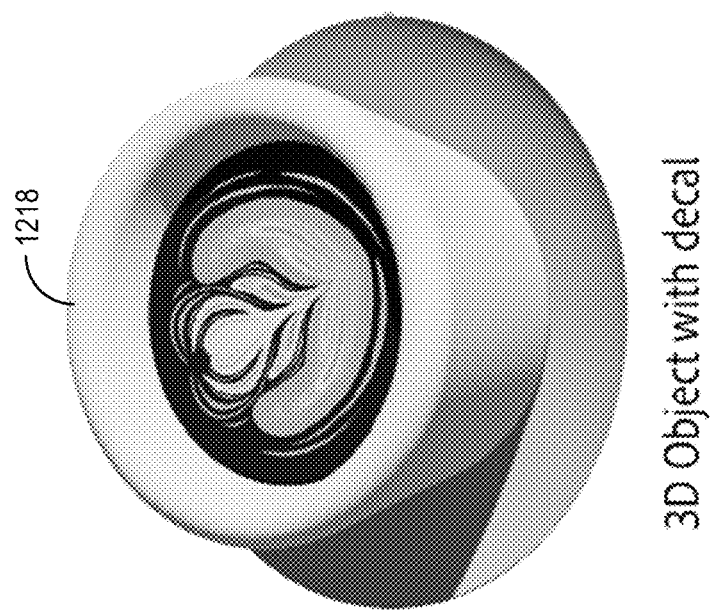
Figure 12C:
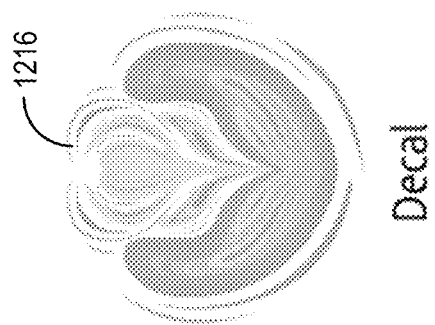
Figure 12C:
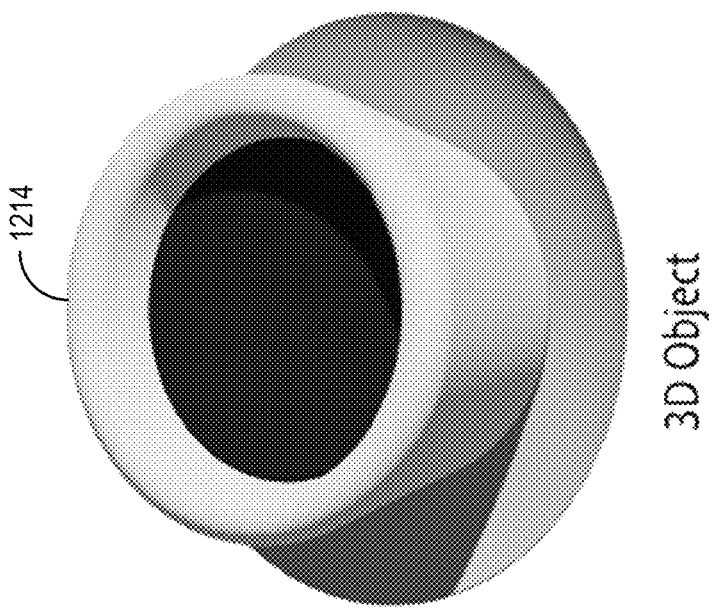
Figure 12D:
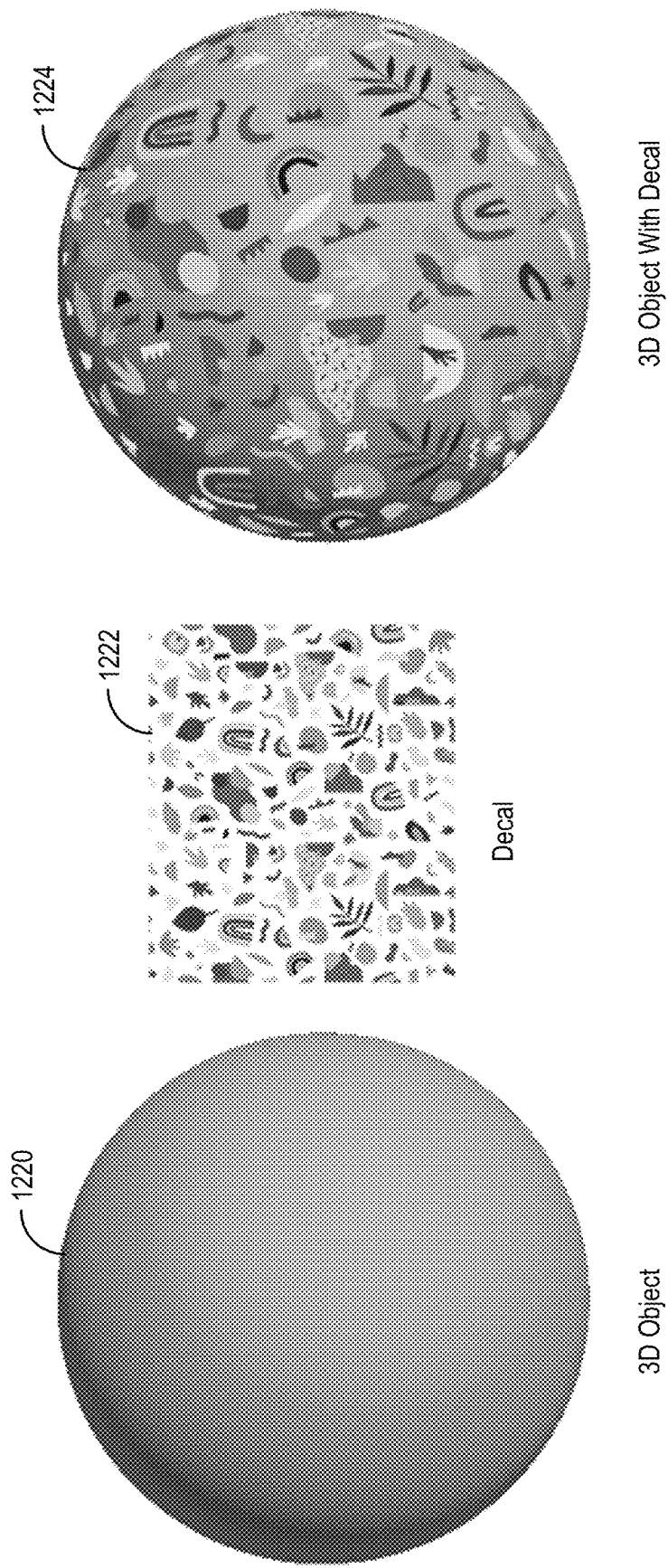

Furthermore, FIGS. 12A-12E illustrate examples of the vector decal application system 106 applying vector-based decals to various 3D objects in accordance with one or more implementations. Indeed, as shown in FIGS. 12A-12E, the vector decal application system 106 applies vector-based decals to various shapes, surfaces, and/or orientations on 3D objects. For example, as shown in FIG. 12A, the vector decal application system 106 applies vector-based decal 1204 to a 3D object 1202 (that is round and angled) to generate (or display) the 3D object 1206. Moreover, as shown in FIG. 12B, the vector decal application system 106 applies multiple vector-based decals 1210 to the 3D object 1208 (that has curves) to generate (or display) the 3D object 1212. Moreover, as illustrated in FIG. 12C, the vector decal application system 106 applies a vector-based decal 1216 to a 3D object 1214 (that includes a shadow and an angle) to generate (or display) the 3D object 1218 (e.g., with the decal having a similar shadow as the original 3D object 1214). Additionally, as shown in FIG. 12D, the vector decal application system 106 applies a vector-based decal 1222 to a spherical 3D object 1220 to generate (or display) a 3D object 1224.

Figure 12E:
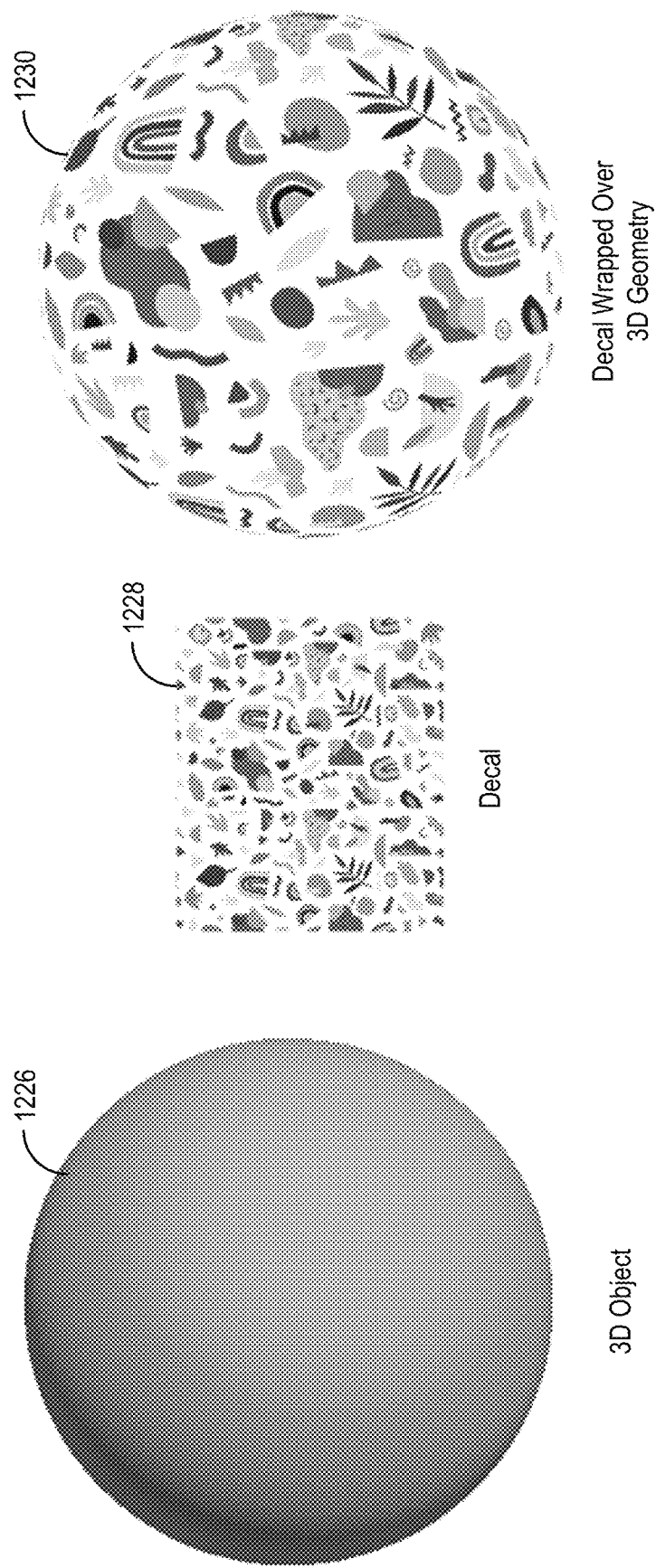

In some cases, the vector decal application system 106 applies vector-based decals to 3D geometries. Indeed, in one or more implementations, the vector decal application system 106 generates vector-based decals (as described above) such that the vector-based decal is decoupled from a rendering pipeline (enabling the vector-based decal to wrap along 3D geometries, such as imaginary 3D objects). As an example, FIG. 12E illustrates the vector decal application system 106 applying a decal 1228 onto a 3D surface of an imaginary 3D object 1226 without rendering the surface of the imaginary 3D object 1226. Indeed, as shown in FIG. 12E, the vector decal application system 106 applies the vector-based decal 1228 to wrap along the imaginary 3D object 1226 (as the wrapped over 3D geometry 1230).

Figure 13:
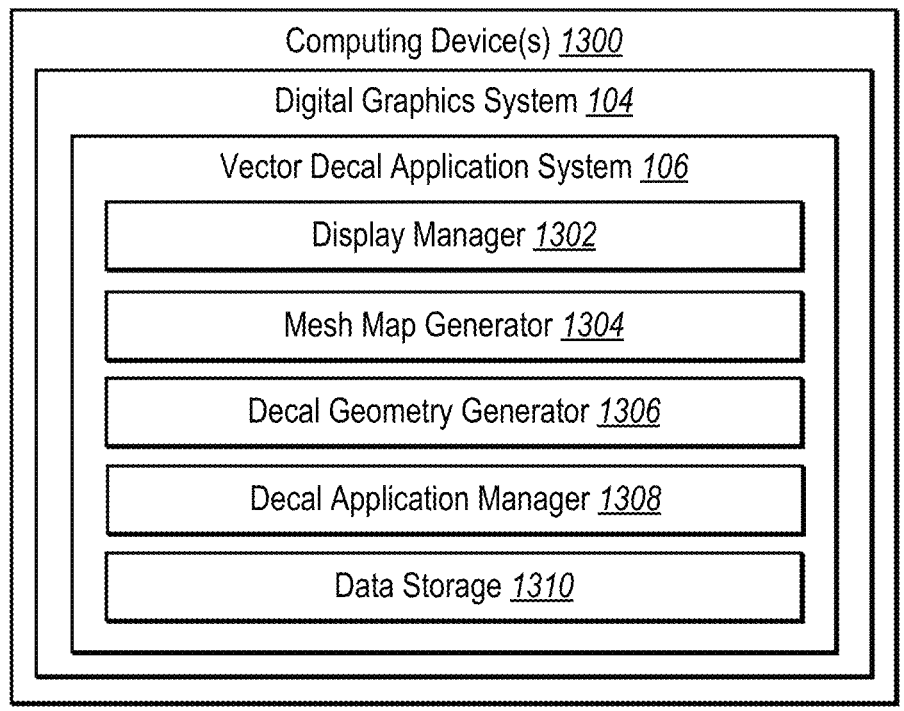
FIG. 13 illustrates a schematic diagram of a vector decal application system in accordance with one or more implementations.

Turning now to FIG. 13, additional detail will be provided regarding components and capabilities of one or more embodiments of the vector decal application system. In particular, FIG. 13 illustrates an example vector decal application system 106 executed by a computing device(s) 1300 (e.g., the server device(s) 102 and/or the client device 110). As shown by the embodiment of FIG. 13, the computing device(s) 1300 includes or hosts the digital graphics system 104 and the vector decal application system 106. Furthermore, as shown in FIG. 13, the digital graphics system 104 includes a display manager 1302, a mesh map generator 1304, a decal geometry generator 1306, a decal application manager 1308, and data storage 1310.

As just mentioned, and as illustrated in the embodiment of FIG. 13, the vector decal application system 106 includes the display manager 1302. For example, the display manager 1302 displays a 3D object and/or vector-based decals as described above (e.g., in relation to FIGS. 2A-2C, 11A-11G, and 12A-12E). Furthermore, in some instances, the display manager receives user interactions to select a decal position, reposition a decal, resize a decal, and/or other modifications to a decal as described above (e.g., in relation to FIGS. 2A-2C, 5, 11A-11G, and 12A-12E).

Moreover, as shown in FIG. 13, the vector decal application system 106 includes the mesh map generator 1304. In some cases, the mesh map generator 1304 generate a mesh map from a 3D mesh of a 3D object as described above (e.g., in relation to FIGS. 3-5). Additionally, in one or more embodiments, the mesh map generator 1304 subdivides faces of a 3D mesh and/or removes occluded faces of a mesh map as described above (e.g., in relation to FIGS. 3-5).

Furthermore, as shown in FIG. 13, the vector decal application system 106 includes the decal geometry generator 1306. In some embodiments, the decal geometry generator 1306 converts a vector-based decal into a decal geometry as described above (e.g., in relation to FIGS. 6-8). In certain instances, the decal geometry generator 1306 places decal geometry on a mesh map and/or clips a decal geometry as described above (e.g., in relation to FIGS. 6-8).

As further shown in FIG. 13, the vector decal application system 106 includes the data storage 1310. In some embodiments, the data storage 1310 maintains data to perform one or more functions of the vector decal application system 106. For example, the data storage 1310 includes 3D objects, vector-based decals, mesh maps, 3D meshes, and/or decal geometries.

Each of the components 1302-1310 of the computing device(s) 1300 (e.g., the computing device(s) 1300 implementing the vector decal application system 106), as shown in FIG. 13, may be in communication with one another using any suitable technology. The components 1302-1310 of the computing device(s) 1300 can comprise software, hardware, or both. For example, the components 1302-1310 can comprise one or more instructions stored on a computer-readable storage medium and executable by processor of one or more computing devices. When executed by the one or more processors, the computer-executable instructions of the vector decal application system 106 (e.g., via the computing device(s) 1300) can cause a client device and/or server device to perform the methods described herein. Alternatively, the components 1302-1310 and their corresponding elements can comprise hardware, such as a special purpose processing device to perform a certain function or group of functions. Additionally, the components 1302-1310 can comprise a combination of computer-executable instructions and hardware.

Furthermore, the components 1302-1310 of the vector decal application system 106 may, for example, be implemented as one or more operating systems, as one or more stand-alone applications, as one or more modules of an application, as one or more plug-ins, as one or more library functions or functions that may be called by other applications, and/or as a cloud-computing model. Thus, the components 1302-1310 may be implemented as a stand-alone application, such as a desktop or mobile application. Furthermore, the components 1302-1310 may be implemented as one or more web-based applications hosted on a remote server. The components 1302-1310 may also be implemented in a suite of mobile device applications or "apps." To illustrate, the components 1302-1310 may be implemented in an application, including but not limited to, ADOBE PHOTOSHOP, ADOBE PREMIERE, ADOBE LIGHTROOM, ADOBE ILLUSTRATOR, or ADOBE SUBSTANCE. "ADOBE," "ADOBE PHOTOSHOP," "ADOBE PREMIERE," "ADOBE LIGHTROOM," "ADOBE ILLUSTRATOR," or "ADOBE SUBSTANCE" are either registered trademarks or trademarks of Adobe Inc. in the United States and/or other countries.

Figure 14:
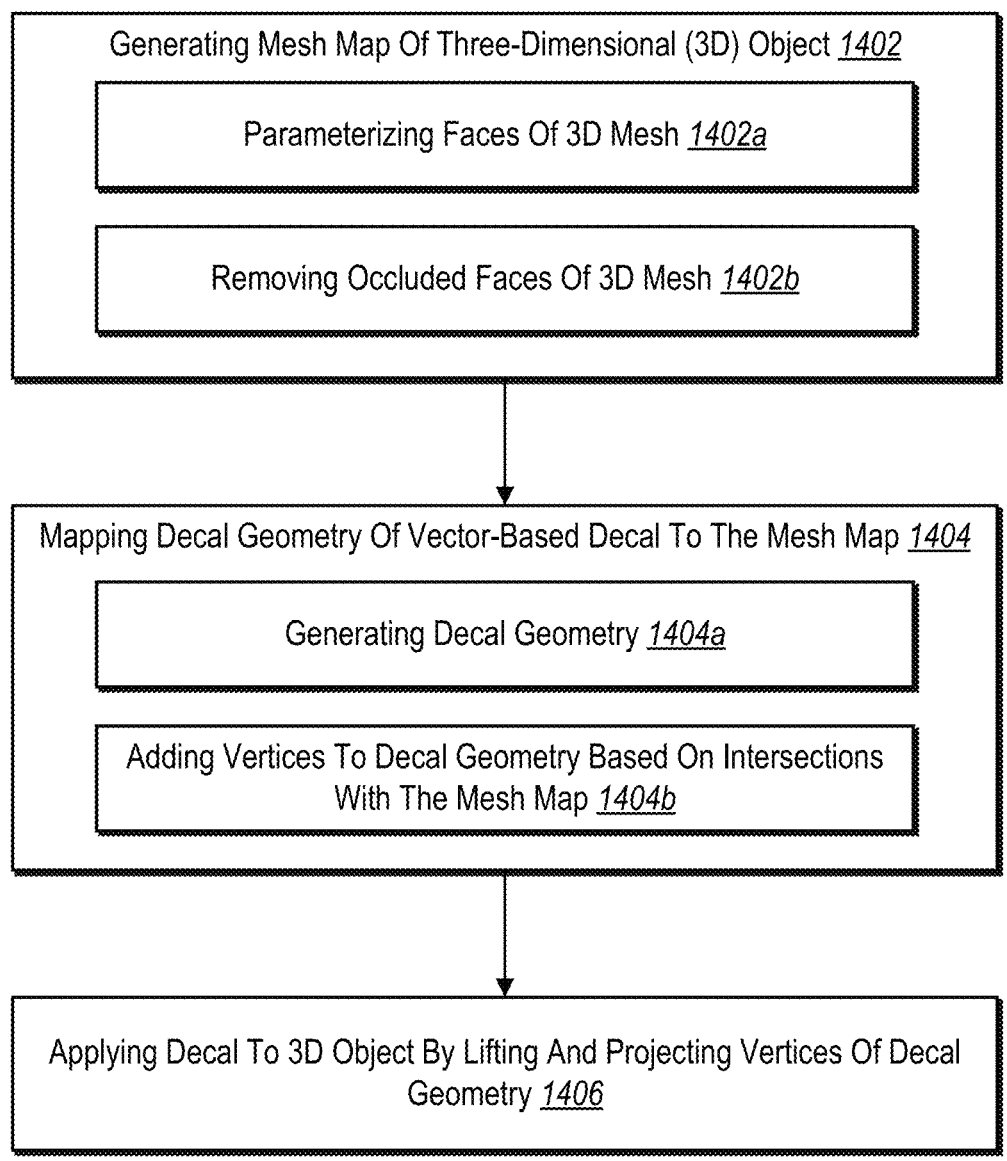
FIG. 14 illustrates a flowchart of a series of acts for applying a vector-based decal on a 3D object in accordance with one or more implementations.

FIGS. 1-13, the corresponding text, and the examples provide a number of different methods, systems, devices, and non-transitory computer-readable media of the vector decal application system 106. In addition to the foregoing, one or more embodiments can also be described in terms of flowcharts comprising acts for accomplishing a particular result, as shown in FIG. 14. The acts shown in FIG. 14 may be performed in connection with more or fewer acts. Further, the acts may be performed in differing orders. Additionally, the acts described herein may be repeated or performed in parallel with one another or parallel with different instances of the same or similar acts. A non-transitory computer-readable medium can comprise instructions that, when executed by one or more processors, cause a computing device to perform the acts of FIG. 14. In some embodiments, a system can be configured to perform the acts of FIG. 14. Alternatively, the acts of FIG. 14 can be performed as part of a computer implemented method.

As mentioned above, FIG. 14 illustrates a flowchart of a series of acts 1400 for applying a vector-based decal on a 3D object in accordance with one or more implementations. While FIG. 14 illustrates acts according to one embodiment, alternative embodiments may omit, add to, reorder, and/or modify any of the acts shown in FIG. 14.

As shown in FIG. 14, the series of acts 1400 include an act 1402 of generating a mesh map of a three-dimensional (3D) object. For instance, the act 1402 includes an act 1402a of parameterizing faces of a 3D mesh. In some cases, the act 1402a includes generating a mesh map of a (user selected) region of a three-dimensional (3D) object by parameterizing faces of a 3D mesh of the 3D object at (the user selected) region. In addition, in some embodiments, the act 1402a includes parameterizing faces of a 3D mesh to generate a UV map as a mesh map. Moreover, in some cases, the act 1402a includes subdividing faces of a 3D mesh to generate additional faces for the 3D mesh. In one or more embodiments, the act 1402a also includes receiving a user selection of a region of a three-dimensional (3D) object and a request to apply a vector-based decal at the region.

Additionally, as shown in FIG. 14 the act 1402 includes an act 1402b of removing occluded faces of a 3D mesh. For example, the act 1402b includes utilizing ray casting to identify one or more occluded faces of a mesh map. In addition, in some cases, the act 1402b includes removing one or more occluded faces from a mesh map.

Furthermore, as shown in FIG. 14, the series of acts 1400 include an act 1404 of mapping decal geometry of a vector-based decal to the mesh map. For example, the act 1404 an act 1404a of generating a decal geometry. In some instances, the act 1404a includes converting a vector-based decal to a set of polylines as a decal geometry. For instance, the act 1404a includes generating a decal geometry by converting curves of a vector-based decal to a set of polylines. Additionally, in some cases, the act 1404a includes aligning a decal geometry with a mesh map, identifying one or more boundaries of the mesh map, and clipping portions of the decal geometry of a vector-based decal outside of the one or more boundaries of the mesh map. In one or more embodiments, the act 1404a includes determining one or more polylines from a set of polylines are outside of one or more boundaries of a mesh map and clipping the one or more polylines from the set of polylines.

Moreover, as shown in FIG. 14, the act 1404 also includes an act 1404b of adding vertices to a decal geometry based on intersections with the mesh map. For example, the act 1404b includes mapping a decal geometry of a vector-based decal to a mesh map by introducing one or more vertices on the decal geometry at one or more intersections between one or more line segments of the decal geometry and one or more edges of the mesh map. For example, the act 1404b includes identifying one or more intersections between one or more line segments of a decal geometry and one or more edges of a mesh map utilizing a bounded volume hierarchy. Moreover, in some implementations, the act 1404b includes adding one or more vertices to one or more line segments of the decal geometry to split one or more line segments at one or more intersections (between one or more line segments of a decal geometry and one or more edges of a mesh map).

In some instances, the act 1404b includes mapping a decal geometry of a vector-based decal to a mesh map by adding vertices to the decal geometry at intersections between the decal geometry and a mesh map. For example, the act 1404b includes identifying intersections between line segments of a decal geometry and edges of a mesh map. Additionally, in some embodiments, the act 1404b includes adding vertices to line segments of a decal geometry to split the line segments at (identified) intersections.

In addition, as shown in FIG. 14, the series of acts 1400 include an act 1406 of applying a decal to a 3D object by lifting and projecting vertices of a decal geometry. For example, the act 1406 includes applying a vector-based decal on a 3D object by projecting one or more vertices of the decal geometry into three dimensions. In some instances, the act 1406 includes projecting one or more vertices of a decal geometry into three dimensions by identifying coordinates of a vertex from the one or more vertices, identifying a face of a mesh map that encloses the vertex, determining a reverse mapping of the face, and projecting the coordinates of the vertex into the three dimensions utilizing the reverse mapping. In one or more embodiments, the act 1406 includes projecting coordinates of one or more vertices of a decal geometry into three-dimensions utilizing reverse mappings of one or more faces of a mesh map that enclose the one or more vertices (to apply a vector-based decal to a 3D object).

In some embodiments, the act 1406 includes displaying a 3D object with a vector-based decal applied to a user selected region utilizing projected vertices of a decal geometry (within a graphical user interface). Moreover, in some instances, the act 1406 includes receiving a user interaction to relocate a vector-based decal to an updated region of a 3D object and displaying the 3D object with the vector-based decal applied at the updated region of the 3D object utilizing an additional mesh map for the updated region and updated vertices of the decal geometry at additional intersections between the decal geometry and the additional mesh map. In some cases, the act 1406 includes applying a vector-based decal on the 3D object as a separate layer from a surface of a 3D object. Additionally, in some cases, the act 1406 includes modifying a vectored-based decal on a 3D object utilizing one or more user selected modification requests. In one or more embodiments, the act 1406 includes receiving a request to modify a vector-based decal and modifying (within the graphical user interface and using the request to modify) a separate layer for the vector-based decal while the vector-based decal is displayed on a 3D object.

Implementations of the present disclosure may comprise or utilize a special purpose or general-purpose computer including computer hardware, such as, for example, one or more processors and system memory, as discussed in greater detail below. Implementations within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., memory), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, implementations of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed by a processor, cause a general-purpose computer, special purpose computer, or special purpose processing device to perform a certain function or group of functions. In some implementations, computer-executable instructions are executed by a general-purpose computer to turn the general-purpose computer into a special purpose computer implementing elements of the disclosure. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Implementations of the present disclosure can also be implemented in cloud computing environments. As used herein, the term "cloud computing" refers to a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In addition, as used herein, the term "cloud-computing environment" refers to an environment in which cloud computing is employed.

Figure 15:
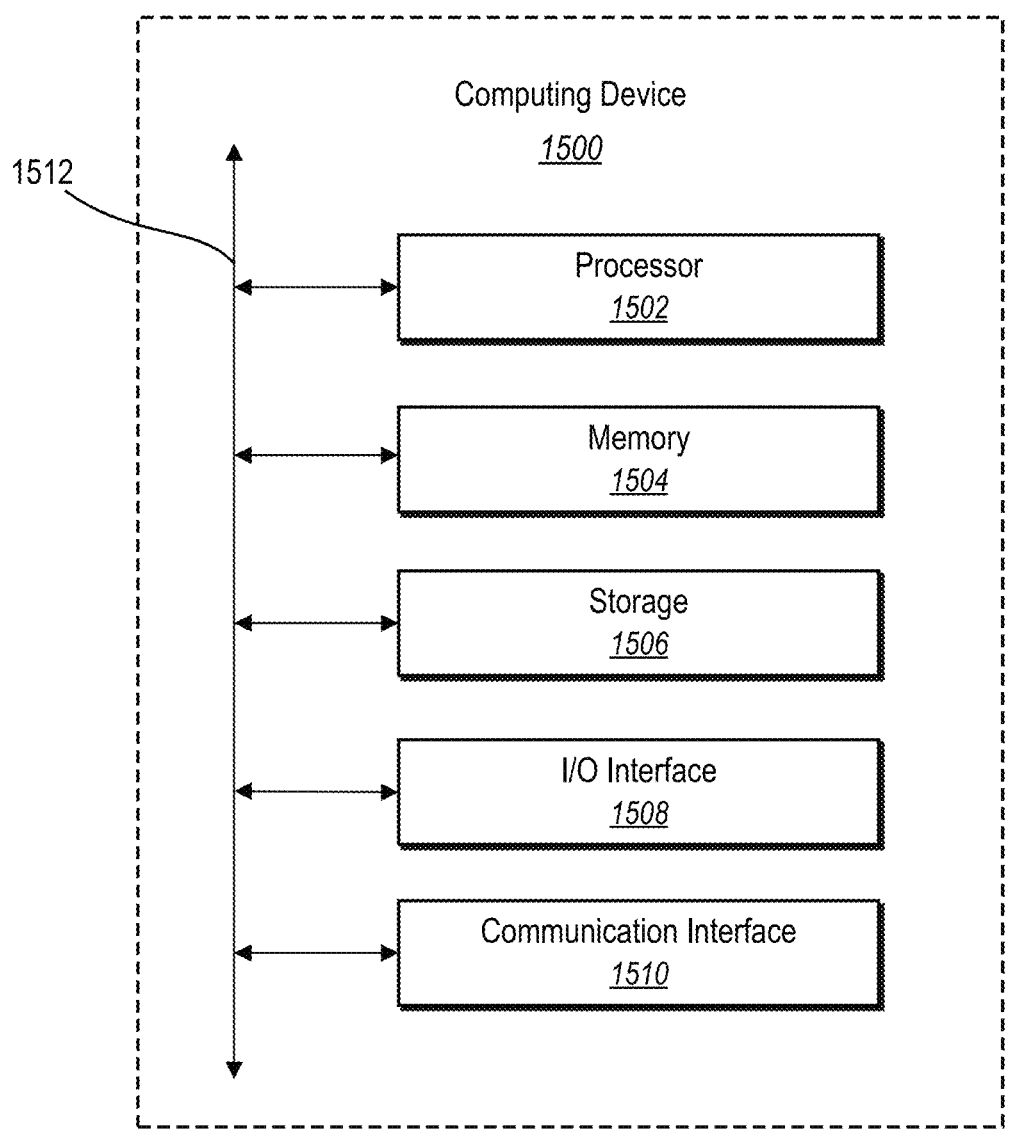
FIG. 15 illustrates a block diagram of an example computing device in accordance with one or more implementations

FIG. 15 illustrates a block diagram of an example computing device 1500 that may be configured to perform one or more of the processes described above. One will appreciate that one or more computing devices, such as the computing device 1500 may represent the computing devices described above (e.g., the computing device(s) 1300, the server device(s) 102, and/or the client device 110). In one or more implementations, the computing device 1500 may be a mobile device (e.g., a mobile telephone, a smartphone, a PDA, a tablet, a laptop, a camera, a tracker, a watch, a wearable device, etc.). In some implementations, the computing device 1500 may be a non-mobile device (e.g., a desktop computer or another type of client device). Further, the computing device 1500 may be a server device that includes cloud-based processing and storage capabilities.

As shown in FIG. 15, the computing device 1500 can include one or more processor(s) 1502, memory 1504, a storage device 1506, input/output interfaces 1508 (or "I/O interfaces 1508"), and a communication interface 1510, which may be communicatively coupled by way of a communication infrastructure (e.g., bus 1512). While the computing device 1500 is shown in FIG. 15, the components illustrated in FIG. 15 are not intended to be limiting. Additional or alternative components may be used in other implementations. Furthermore, in certain implementations, the computing device 1500 includes fewer components than those shown in FIG. 15. Components of the computing device 1500 shown in FIG. 15 will now be described in additional detail.

In particular implementations, the processor(s) 1502 includes hardware for executing instructions, such as those making up a computer program. As an example, and not by way of limitation, to execute instructions, the processor(s) 1502 may retrieve (or fetch) the instructions from an internal register, an internal cache, memory 1504, or a storage device 1506 and decode and execute them.

The computing device 1500 includes memory 1504, which is coupled to the processor(s) 1502. The memory 1504 may be used for storing data, metadata, and programs for execution by the processor(s). The memory 1504 may include one or more of volatile and non-volatile memories, such as Random-Access Memory ("RAM"), Read-Only Memory ("ROM"), a solid-state disk ("SSD"), Flash, Phase Change Memory ("PCM"), or other types of data storage. The memory 1504 may be internal or distributed memory.

The computing device 1500 includes a storage device 1506 includes storage for storing data or instructions. As an example, and not by way of limitation, the storage device 1506 can include a non-transitory storage medium described above. The storage device 1506 may include a hard disk drive ("HDD"), flash memory, a Universal Serial Bus ("USB") drive or a combination these or other storage devices.

As shown, the computing device 1500 includes one or more I/O interfaces 1508, which are provided to allow a user to provide input to (such as user strokes), receive output from, and otherwise transfer data to and from the computing device 1500. These I/O interfaces 1508 may include a mouse, keypad or a keyboard, a touch screen, camera, optical scanner, network interface, modem, other known I/O devices or a combination of such I/O interfaces 1508. The touch screen may be activated with a stylus or a finger.

The I/O interfaces 1508 may include one or more devices for presenting output to a user, including, but not limited to, a graphics engine, a display (e.g., a display screen), one or more output drivers (e.g., display drivers), one or more audio speakers, and one or more audio drivers. In certain implementations, I/O interfaces 1508 are configured to provide graphical data to a display for presentation to a user. The graphical data may be representative of one or more graphical user interfaces and/or any other graphical content as may serve a particular implementation.

The computing device 1500 can further include a communication interface 1510. The communication interface 1510 can include hardware, software, or both. The communication interface 1510 provides one or more interfaces for communication (such as, for example, packet-based communication) between the computing device and one or more other computing devices or one or more networks. As an example, and not by way of limitation, communication interface 1510 may include a network interface controller ("NIC") or network adapter for communicating with an Ethernet or other wire-based network or a wireless NIC ("WNIC") or wireless adapter for communicating with a wireless network, such as a WI-FI. The computing device 1510 can further include a bus 1512. The bus 1512 can include hardware, software, or both that connects components of the computing device 1500 to each other.

In the foregoing specification, the invention has been described with reference to specific example implementations thereof. Various implementations and aspects of the invention(s) are described with reference to details discussed herein, and the accompanying drawings illustrate the various implementations. The description above and drawings are illustrative of the invention and are not to be construed as limiting the invention. Numerous specific details are described to provide a thorough understanding of various implementations of the present invention.

The present invention may be embodied in other specific forms without departing from its spirit or essential characteristics. The described implementations are to be considered in all respects only as illustrative and not restrictive. For example, the methods described herein may be performed with less or more steps/acts or the steps/acts may be performed in differing orders. Additionally, the steps/acts described herein may be repeated or performed in parallel to one another or in parallel to different instances of the same or similar steps/acts. The scope of the invention is, therefore, indicated by the appended claims rather than by the foregoing description. All changes that come within the meaning and range of equivalency of the claims are to be embraced within their scope.

What is claimed is:

1. A computer-implemented method comprising:
generating a mesh map of a user selected region of a three-dimensional (3D) object by parameterizing faces of a 3D mesh of the 3D object at the user selected region;
mapping a vector-based decal geometry of a vector-based decal to the mesh map by introducing one or more vertices on the vector-based decal geometry at one or more intersections between one or more line segments of the vector-based decal geometry and one or more edges of the mesh map; and
applying the vector-based decal on the 3D object by projecting the one or more vertices of the vector-based decal geometry into three dimensions to facilitate resolution independent vector transformations of the vector-based decal on the 3D object.

2. The computer-implemented method of claim 1, further comprising parameterizing the faces of the 3D mesh to generate a UV map as the mesh map.

3. The computer-implemented method of claim 1, further comprising subdividing faces of the 3D mesh to generate additional faces for the 3D mesh.

4. The computer-implemented method of claim 1, further comprising generating the vector-based decal geometry by converting curves of the vector-based decal to a set of polylines.

5. The computer-implemented method of claim 1, further comprising:
aligning the vector-based decal geometry with the mesh map;
identifying one or more boundaries of the mesh map; and
clipping portions of the vector-based decal geometry of the vector-based decal outside of the one or more boundaries of the mesh map.

6. The computer-implemented method of claim 1, further comprising:
utilizing ray casting to identify one or more occluded faces of the mesh map; and
removing the one or more occluded faces from the mesh map.

7. The computer-implemented method of claim 1, further comprising:
identifying one or more intersections between one or more line segments of the vector-based decal geometry and one or more edges of the mesh map utilizing a bounded volume hierarchy; and
adding the one or more vertices to the one or more line segments of the vector-based decal geometry to split the one or more line segments at the one or more intersections.

8. The computer-implemented method of claim 1, further comprising projecting the one or more vertices of the vector-based decal geometry into the three dimensions by:
identifying coordinates of a vertex from the one or more vertices;
identifying a face of the mesh map that encloses the vertex;
determining a reverse mapping of the face; and
projecting the coordinates of the vertex into the three dimensions utilizing the reverse mapping.

9. The computer-implemented method of claim 1, further comprising:
applying the vector-based decal on the 3D object as a separate layer from a surface of the 3D object; and
modifying the vectored-based decal on the 3D object utilizing one or more user selected modification requests.

10. A non-transitory computer-readable medium storing instructions that, when executed by at least one processor, cause the at least one processor to perform operations comprising:
receiving a user selection of a region of a three-dimensional (3D) object and a request to apply a vector-based decal at the region;
generating a mesh map of the user selected region of the 3D object by parameterizing faces of a 3D mesh of the 3D object at the user selected region;
mapping a vector-based decal geometry of the vector-based decal to the mesh map by adding vertices to the vector-based decal geometry at intersections between the vector-based decal geometry and the mesh map;
projecting the vertices of the vector-based decal geometry into three-dimensions to facilitate resolution independent vector transformations of the vector-based decal on the 3D object; and
displaying the 3D object with the vector-based decal applied to the user selected region utilizing the projected vertices of the vector-based decal geometry.

11. The non-transitory computer-readable medium of claim 10, wherein the operations further comprise:
receiving a user interaction to relocate the vector-based decal to an updated region of the 3D object; and
displaying the 3D object with the vector-based decal applied at the updated region of the 3D object utilizing an additional mesh map for the updated region and updated vertices of the vector-based decal geometry at additional intersections between the vector-based decal geometry and the additional mesh map.

12. The non-transitory computer-readable medium of claim 10, wherein the operations further comprise:
subdividing faces of the 3D mesh to generate additional faces for the 3D mesh;
parameterizing the faces of the 3D mesh to generate a UV map as the mesh map; and
removing one or more occluded faces of the mesh map.

13. The non-transitory computer-readable medium of claim 10, wherein the operations further comprise:
converting the vector-based decal to a set of polylines as the vector-based decal geometry;
determining one or more polylines from the set of polylines are outside of one or more boundaries of the mesh map; and
clipping the one or more polylines from the set of polylines.

14. The non-transitory computer-readable medium of claim 10, wherein the operations further comprise mapping the vector-based decal geometry to the mesh map by:
identifying intersections between line segments of the vector-based decal geometry and edges of the mesh map; and
adding the vertices to the line segments of the vector-based decal geometry to split the line segments at the intersections.

15. The non-transitory computer-readable medium of claim 10, wherein the operations further comprise projecting coordinates of the vertices of the vector-based decal geometry into the three-dimensions utilizing reverse mappings of faces of the mesh map that enclose the vertices.

16. A system comprising:
a memory component comprising a three-dimensional (3D) object and a vector-based decal; and a processing device coupled to the memory component, the processing device to perform operations comprising:
  generating a mesh map for a region of the 3D object by parameterizing faces of a 3D mesh of the 3D object at the region;
  mapping a vector-based decal geometry of the vector-based decal to the mesh map by:
    identifying one or more intersections between one or more line segments of the vector-based decal geometry and one or more edges of the mesh map; and
    adding one or more vertices to the one or more line segments of the vector-based decal geometry at the one or more intersections; and
  applying the vector-based decal to the 3D object by projecting coordinates of the one or more vertices of the vector-based decal geometry into three-dimensions utilizing reverse mappings of one or more faces of the mesh map that enclose the coordinates of the one or more vertices to facilitate resolution independent vector transformations of the vector-based decal on the 3D object.

17. The system of claim 16, wherein the operations further comprise:
  subdividing faces of the 3D mesh to generate additional faces for the 3D mesh;
  parameterizing the faces of the 3D mesh to generate a UV map as the mesh map; and
  removing one or more occluded faces of the mesh map.

18. The system of claim 16, wherein the operations further comprise:
  converting the vector-based decal to a set of polylines as the vector-based decal geometry;
  determining one or more polylines from the set of polylines are outside of one or more boundaries of the mesh map; and
  clipping the one or more polylines from the set of polylines.

19. The system of claim 16, wherein the operations further comprise applying the vector-based decal on the 3D object as a separate layer from a surface of the 3D object.

20. The system of claim 19, wherein the operations further comprise:
  displaying, within a graphical user interface, the 3D object with the applied vector-based decal;
  receiving a request to modify the vector-based decal; and
  modifying, within the graphical user interface and using the request to modify, the separate layer for the vector-based decal while the vector-based decal is displayed on the 3D object.

* * * * *